US008572077B2

(12) United States Patent  
Dorfman et al.

(10) Patent No.: US 8,572,077 B2
(45) Date of Patent: *Oct. 29, 2013

(54) SYSTEM AND METHOD FOR DISPLAYING INFORMATION IN RESPONSE TO A REQUEST

(75) Inventors: Barnaby M. Dorfman, Palo Alto, CA (US); Udi Manber, Palo Alto, CA (US); Jonathan A. Gold, Palo Alto, CA (US); Huy T. Ha, Oakland, CA (US); Timothy Caro-Bruce, San Francisco, CA (US); Jason Karls, Burlingame, CA (US)

(73) Assignee: A9.com, Inc., Palo Alto, CA (US)

( * ) Notice: Subject to any disclaimer, the term of this patent is extended or adjusted under 35 U.S.C. 154(b) by 435 days.

This patent is subject to a terminal disclaimer.

(21) Appl. No.: 11/674,651

(22) Filed: Feb. 13, 2007

(65) Prior Publication Data

US 2007/0136259 A1 Jun. 14, 2007

Related U.S. Application Data

(60) Division of application No. 11/045,007, filed on Jan. 26, 2005, now Pat. No. 7,359,797, which is a continuation-in-part of application No. 10/809,049, filed on Mar. 24, 2004, now Pat. No. 7,155,336.

(51) Int. Cl.
 *G06F 7/00* (2006.01)
 *G06F 17/30* (2006.01)
(52) U.S. Cl.
 USPC ............ 707/729; 707/758; 707/724; 707/727
(58) Field of Classification Search
 USPC .......................................................... 707/3
 See application file for complete search history.

(56) References Cited

U.S. PATENT DOCUMENTS

| | | |
|---|---|---|
| 5,559,707 A | 9/1996 | DeLome et al. |
| 5,602,564 A | 2/1997 | Iwamura et al. |
| 5,633,946 A | 5/1997 | Lachinski et al. |
| 5,862,310 A * | 1/1999 | Crawford et al. ............ 358/1.18 |
| 5,874,905 A | 2/1999 | Nanba et al. |
| 5,913,078 A | 6/1999 | Kimura et al. |
| 5,978,804 A | 11/1999 | Dietzman |
| 5,987,136 A | 11/1999 | Schipper et al. |
| 6,006,161 A | 12/1999 | Katou |

(Continued)

OTHER PUBLICATIONS

Robert H Anderson; Design Considerations for Computer-Based Interactive Map Display System;1979; RAND;pp. 1-63.*

(Continued)

*Primary Examiner* — Shew-Fen Lin
*Assistant Examiner* — Jermaine Mincey
(74) *Attorney, Agent, or Firm* — Novak Druce Connolly Bove + Quigg LLP

(57) ABSTRACT

Embodiments of the present invention provide a method and system for generating an online listing, such as a yellow pages listing, that includes information about an object, such as a business, and also includes at least one image of the structure containing the object. For example, the image may be a digital image of the store front of a business taken at a street view. Additionally, a user may select an image from a plurality of images that the user perceives as being an appropriate representative image for the business. Based on votes received a default representative image may be identified that is provided in response to a request for information about the business.

51 Claims, 14 Drawing Sheets

(56) References Cited

U.S. PATENT DOCUMENTS

| | | | |
|---|---|---|---|
| 6,035,253 A | 3/2000 | Hayashi et al. | |
| 6,097,393 A | 8/2000 | Prouty, IV et al. | |
| 6,169,552 B1 | 1/2001 | Endo et al. | |
| 6,182,010 B1 | 1/2001 | Berstis | |
| 6,247,009 B1 * | 6/2001 | Shiiyama et al. | 1/1 |
| 6,249,742 B1 | 6/2001 | Friederich et al. | |
| 6,285,317 B1 | 9/2001 | Ong | |
| 6,307,573 B1 * | 10/2001 | Barros | 715/764 |
| 6,321,158 B1 | 11/2001 | DeLorme et al. | |
| 6,324,469 B1 | 11/2001 | Okude et al. | |
| 6,335,754 B1 | 1/2002 | Endo et al. | |
| 6,356,840 B2 | 3/2002 | Kusama | |
| 6,360,168 B1 | 3/2002 | Shimabara | |
| 6,363,161 B2 | 3/2002 | Laumeyer et al. | |
| 6,374,241 B1 * | 4/2002 | Lamburt et al. | 1/1 |
| 6,388,688 B1 | 5/2002 | Schileru-Key | |
| 6,449,384 B2 | 9/2002 | Laumeyer et al. | |
| 6,487,495 B1 * | 11/2002 | Gale et al. | 701/209 |
| 6,496,776 B1 | 12/2002 | Blumberg et al. | |
| 6,504,571 B1 * | 1/2003 | Narayanaswami et al. | 348/231.99 |
| 6,519,592 B1 * | 2/2003 | Getchius et al. | 1/1 |
| 6,556,878 B1 | 4/2003 | Fielding | |
| 6,580,441 B2 | 6/2003 | Schileru-Key | |
| 6,587,784 B1 | 7/2003 | Okude et al. | |
| 6,621,423 B1 | 9/2003 | Cooper et al. | |
| 6,625,315 B2 | 9/2003 | Laumeyer et al. | |
| 6,636,803 B1 * | 10/2003 | Hartz et al. | 701/208 |
| 6,643,640 B1 * | 11/2003 | Getchius et al. | 707/719 |
| 6,710,774 B1 | 3/2004 | Kawasaki et al. | |
| 6,711,379 B1 | 3/2004 | Owa et al. | |
| 6,775,614 B2 | 8/2004 | Kim | |
| 6,810,323 B1 | 10/2004 | Bullock et al. | |
| 6,836,270 B2 | 12/2004 | Du | |
| 6,871,143 B2 | 3/2005 | Fujiwara | |
| 6,885,939 B2 | 4/2005 | Schmidt et al. | |
| 6,903,763 B1 | 6/2005 | Noguchi et al. | |
| 6,906,643 B2 | 6/2005 | Samadani et al. | |
| 6,917,878 B2 | 7/2005 | Pechatnikov et al. | |
| 6,928,364 B2 | 8/2005 | Tsuyuki | |
| 6,928,634 B2 | 8/2005 | Granik et al. | |
| 6,954,696 B2 | 10/2005 | Ihara et al. | |
| 6,956,590 B1 | 10/2005 | Barton et al. | |
| 6,999,075 B2 | 2/2006 | Kumagai | |
| 7,007,228 B1 | 2/2006 | Carro | |
| 7,039,521 B2 | 5/2006 | Hortner et al. | |
| 7,039,630 B2 | 5/2006 | Shimazu | |
| 7,082,706 B1 | 8/2006 | Stinis et al. | |
| 7,096,211 B2 | 8/2006 | Fujihara | |
| 7,096,428 B2 | 8/2006 | Foote et al. | |
| 7,155,336 B2 | 12/2006 | Dorfman et al. | |
| 7,158,079 B2 | 1/2007 | Motoyama | |
| 7,170,518 B1 | 1/2007 | Millington et al. | |
| 7,222,021 B2 | 5/2007 | Ootomo et al. | |
| 7,272,501 B2 | 9/2007 | Dorfman et al. | |
| 7,289,138 B2 | 10/2007 | Foote et al. | |
| 7,298,378 B1 | 11/2007 | Hagenbuch et al. | |
| 7,334,190 B2 | 2/2008 | Wierowski | |
| 7,359,797 B2 | 4/2008 | Dorfman et al. | |
| 7,389,181 B2 | 6/2008 | Meadow et al. | |
| 7,411,594 B2 | 8/2008 | Endo et al. | |
| 7,460,953 B2 | 12/2008 | Herbst et al. | |
| 7,467,356 B2 | 12/2008 | Gettman et al. | |
| 7,518,636 B2 | 4/2009 | Endo et al. | |
| 7,526,715 B2 | 4/2009 | Litsyn et al. | |
| 7,539,572 B2 | 5/2009 | Kamikawa et al. | |
| 7,827,507 B2 | 11/2010 | Geise et al. | |
| 7,974,781 B2 | 7/2011 | Emoto et al. | |
| 7,990,394 B2 | 8/2011 | Vincent et al. | |
| 8,009,178 B2 | 8/2011 | Chen et al. | |
| 8,154,599 B2 | 4/2012 | Aoki et al. | |
| 2001/0029500 A1 * | 10/2001 | Tanaka | 707/3 |
| 2001/0034661 A1 | 10/2001 | Ferreira | |
| 2001/0037305 A1 | 11/2001 | Mochizuki | |
| 2001/0045949 A1 * | 11/2001 | Chithambaram et al. | 345/418 |
| 2002/0047895 A1 | 4/2002 | Bernardo et al. | |
| 2002/0063705 A1 | 5/2002 | Moriwaki et al. | |
| 2002/0065691 A1 * | 5/2002 | Twig et al. | 705/7 |
| 2002/0070981 A1 | 6/2002 | Kida | |
| 2002/0123841 A1 | 9/2002 | Satoh et al. | |
| 2002/0138470 A1 * | 9/2002 | Zhou | 707/3 |
| 2002/0145620 A1 | 10/2002 | Smith et al. | |
| 2002/0154174 A1 | 10/2002 | Redlich et al. | |
| 2002/0163547 A1 * | 11/2002 | Abramson et al. | 345/855 |
| 2002/0191000 A1 * | 12/2002 | Henn | 345/619 |
| 2003/0004802 A1 * | 1/2003 | Callegari | 705/14 |
| 2003/0007668 A1 | 1/2003 | Kotake et al. | |
| 2003/0011599 A1 * | 1/2003 | Du | 345/428 |
| 2003/0016228 A1 | 1/2003 | Youngblood et al. | |
| 2003/0018427 A1 | 1/2003 | Yokota et al. | |
| 2003/0023375 A1 | 1/2003 | Yoshida | |
| 2003/0036848 A1 | 2/2003 | Sheha et al. | |
| 2003/0060971 A1 | 3/2003 | Millington et al. | |
| 2003/0061211 A1 * | 3/2003 | Shultz et al. | 707/3 |
| 2003/0063133 A1 | 4/2003 | Foote et al. | |
| 2003/0065446 A1 | 4/2003 | Ootomo et al. | |
| 2003/0078724 A1 | 4/2003 | Kamikawa et al. | |
| 2003/0107569 A1 | 6/2003 | Endo et al. | |
| 2003/0142115 A1 | 7/2003 | Endo et al. | |
| 2003/0176966 A1 | 9/2003 | Yamashita et al. | |
| 2003/0182052 A1 | 9/2003 | DeLorme et al. | |
| 2003/0191578 A1 | 10/2003 | Paulauskas et al. | |
| 2003/0208315 A1 | 11/2003 | Mays | |
| 2003/0220918 A1 * | 11/2003 | Roy et al. | 707/3 |
| 2004/0004659 A1 | 1/2004 | Foote et al. | |
| 2004/0005078 A1 | 1/2004 | Tillotson | |
| 2004/0073538 A1 * | 4/2004 | Leishman et al. | 707/3 |
| 2004/0078813 A1 | 4/2004 | Kobuya et al. | |
| 2004/0107072 A1 | 6/2004 | Dietrich et al. | |
| 2004/0128215 A1 | 7/2004 | Florance et al. | |
| 2004/0138817 A1 | 7/2004 | Zoken et al. | |
| 2004/0150534 A1 | 8/2004 | Linn | |
| 2004/0174386 A1 | 9/2004 | Kotake et al. | |
| 2004/0215390 A1 | 10/2004 | Nomura | |
| 2004/0249565 A1 | 12/2004 | Park | |
| 2005/0004749 A1 | 1/2005 | Park | |
| 2005/0021376 A1 * | 1/2005 | Zaleski et al. | 705/3 |
| 2005/0034074 A1 | 2/2005 | Munson et al. | |
| 2005/0086612 A1 | 4/2005 | Gettman et al. | |
| 2005/0099494 A1 | 5/2005 | Deng et al. | |
| 2005/0116964 A1 | 6/2005 | Kotake et al. | |
| 2005/0132305 A1 | 6/2005 | Guichard et al. | |
| 2005/0192025 A1 | 9/2005 | Kaplan | |
| 2005/0216186 A1 | 9/2005 | Dorfman et al. | |
| 2005/0234638 A1 | 10/2005 | Ogaki et al. | |
| 2005/0268254 A1 | 12/2005 | Abramson et al. | |
| 2005/0273252 A1 | 12/2005 | Nix et al. | |
| 2006/0004512 A1 | 1/2006 | Herbst et al. | |
| 2006/0031786 A1 | 2/2006 | Hillis et al. | |
| 2006/0089792 A1 | 4/2006 | Manber et al. | |
| 2006/0174209 A1 | 8/2006 | Barros | |
| 2006/0178818 A1 | 8/2006 | Dhollande | |
| 2006/0271287 A1 | 11/2006 | Gold et al. | |
| 2007/0136259 A1 | 6/2007 | Dorfman et al. | |
| 2007/0143676 A1 | 6/2007 | Chen | |
| 2007/0150188 A1 | 6/2007 | Rosenberg | |
| 2008/0189130 A1 | 8/2008 | Dorfman et al. | |
| 2008/0195314 A1 | 8/2008 | Green | |
| 2010/0088017 A1 | 4/2010 | Ujino | |

OTHER PUBLICATIONS

"iStreetView™ 360-Degree Geo-Coded Street Level Imaging on the Web," © 2003 @City, <http://www.atcity.com> [retrieved May 3, 2004].

"MDL:: Product Range—Surveying & GIS," <http://www.mdl.co.uk/product_range_surveying.htm> [retrieved Dec. 21, 2003].

"MDL:: Product Range—VideoAce," <http://www.mdl.co.uk/products_videoace.htm> [retrieved Dec. 21, 2003].

[Red Hen Web Pages], © 1994-2003 Red Hen Systems, Inc., <http://www.redhensystems.com...> [retrieved Dec. 18, 2003].

"Trimble—Mapping & GIS," ©2003 Trimble Navigation Limited, <http://www.trimble.com/mappinggis.html> [retrieved Dec. 21, 2003].

(56) References Cited

OTHER PUBLICATIONS

"iStreetView™ 360-Degree Geo-Coded Street Level Imaging on the Web," © 2003 @City, http://www.atcity.com [retrieved May 3, 2004].
Hinman, K., "From Chimney Pot to Loge, a Virtual Close-Up of Paris," The New York Times Company, Apr. 3, 2003, 2 pages.
"MDL:: Product Range—Surveying & GIS," ,http://www.mdl.co.uk/product_range_surveying.htm> [retrieved Dec. 21, 2003].
"MDL:: Product Range—VideoAce," ,http://www.mdl.co.uk/products_videoace.htm> [retrieved Dec. 21, 2003].
[Red Hen Web Pages], © 1994-2003 Red Hen Systems, Inc.,http://redhensystems.com.html. [ retrieved Dec. 18, 2003].
"Trimble—Mapping & GIS," © 2003 Trimble Navigation Limited, ,http://www.trimble.com/mappingsgis.html. [ retrieved Dec. 21, 2003].
Office Action dated Oct. 31, 2012,issued in related Canadian Patent Application No. 2,559,726, filed Mar. 24, 2005.
Office Action dated Feb. 25, 2011, issued in related in India Patent Application No. 2571/KOLNP/2006, filed Sep. 7, 2006.
Office Action dated Dec. 2, 2011, issued in related India Patent Application No. 2571/KOLNP/2006, filed Sep. 7, 2006.

* cited by examiner

SYSTEM AND METHOD FOR DISPLAYING INFORMATION IN RESPONSE TO A REQUEST

CROSS-REFERENCES TO RELATED APPLICATIONS

This application is a divisional of U.S. patent application Ser. No. 11/045,007, filed Jan. 26, 2005, which is a continuation-in-part of U.S. patent application Ser. No. 10/809,049, filed Mar. 24, 2004, now U.S. Pat. No. 7,155,336, which are incorporated herein by reference.

FIELD OF THE INVENTION

The present invention is related to production of online directories and, more specifically, to online directories, such as Yellow Pages, at which a user can view images of directory listings.

BACKGROUND

Various online directories, such as online Yellow Pages, are available for users to locate and find information about businesses and services. Typically, when searching an online business directory, a user is prompted to enter selection criteria such as the general geographic location (e.g., state and city) and the type or category of business (e.g., restaurant) that the user is looking for, or perhaps the name of the business itself, if known. In response, listings for each of the businesses that meet the user's selection criteria are displayed. Each listing typically identifies the name, address, and phone number of the listed business. Further, each listing may be associated with icons that the user may click to obtain further information about the business, such as a map of an area around the business and driving directions to the business. Current online directories, however, do not provide listings that can be displayed with an image of the physical location of the business featured in the listing. While some aerial or rooftop images are available online in correlation with addresses, such aerial or rooftop views are of limited value because they do not show, for example, business buildings in the manner actually perceived by customers (i.e., at the ground or street level). More particularly, what is lacking is an automated system and method for collecting and displaying images of objects at geographic locations, such as business storefronts and street views of structures, in online directories.

SUMMARY

The present invention provides methods and systems whereby online directories, such as online Yellow Pages, may feature listings with an associated image of the business. Thus, a user accessing an online Yellow Page directory prepared using embodiments of the present invention can visually appreciate the business, i.e., its building and also perhaps its surrounding area. From the businesses' point of view, an online Yellow Page directory that uses embodiments of the present invention provides value-added media through which the businesses can visually appeal to their potential customers to hopefully attract more business.

According to one aspect, the present invention provides a method of automatically collecting images of objects at geographic locations for publication in an online directory. In one embodiment, an operator first mounts on a vehicle at least one camera (video or still) and a GPS receiver, each having access to a synchronized clock. Second, the operator drives the vehicle while capturing images with the camera and also recording geographic locations (e.g., longitude and latitude coordinates) as determined by the GPS receiver. Both the image data obtained by the camera and geographic location data obtained by the GPS receiver are time-stamped. Third, both the object captured and each image are associated with a geographic location based on corresponding respective timestamps of the image data and geographic location data. (Alternatively, a GPS receiver/camera combination system that automatically encodes the geographic location data obtained from the GPS receiver onto, for example, the audio track of a video tape may be used, to produce images each associated with a geographic location. It is noted that this embodiment eliminates the need to synchronize clocks.) Assuming that the location of the camera coincides with the location of the GPS receiver and by offsetting the distance from the camera to the object (e.g., business building) being imaged, each image can be associated with the geographic location (e.g., longitude and latitude coordinates) of the object shown in the image. Fourth, each image is correlated with a street address based on each image's geographic location, for example, by referring to a lookup table that correlates street addresses with geographic location. The address-correlated images may then be used in an online directory, where each listing (including an address) can be displayed together with a corresponding image taken by the camera at the address in the listing.

In further embodiments, multiple cameras may be mounted on the vehicle. For example, two cameras may be mounted facing two opposite directions, to simultaneously collect images on both sides of a street.

The offset distance between the location of the camera (and the GPS receiver) and the object being imaged by the camera can be preset or may be measured by a range finder that is also mounted on the vehicle in a location coinciding with the camera and GPS receiver. The range finder may collect time-stamped distance information indicating the varying distance from the GPS receiver and camera to the object viewed by the range finder.

According to another aspect, the present invention provides a method of preparing images of objects at geographic locations for use in an online directory. Images of objects are received and each image is associated with a geographic location. Each image is then correlated with an address based on the image's then associated geographic location, for example, in reference to a lookup table that correlates addresses with geographic locations. Alternatively, each address may have a boundary defined surrounding the address and images having associated coordinates within the defined boundary may be correlated with the address. Additionally, a representative image may be selected for each address. The address-correlated images are provided for display with listings in an online directory based on the addresses in the listings. Specifically, an image can be published in the online directory such that the image is selected and displayed based on the address correlated with the image. A method of preparing images for use in an online directory may be provided in the form of computer-executable instructions stored on a computer-readable medium that, when read and executed by a computer processor, result in performing the steps of the method.

According to yet another aspect, the present invention provides a computer system for preparing images of objects at geographic locations for use in an online directory. One exemplary embodiment of the computer system includes a first component comprising an input/output interface for receiving images that are associated with geographic locations. A second component of the system is a memory with information that correlates addresses with geographic locations. A third component is a processor coupled to the input/output interface and the memory. The processor is configured to execute computer instructions that cause the processor to correlate each image received via the input/output interface with an address by referring to the information stored in the memory. The processor then provides each image for display with a listing in an online directory based on the address in the listing.

Once the address-correlated images are prepared, they are loaded to a server system in communication with a client system for supporting an online directory, wherein the address in each listing is correlated with an image of an object taken at the geographic location of the address. In one embodiment, the server system receives selection criteria for at least one listing from a client system. The server system displays on the client system at least one listing (e.g., business name, address, phone number, etc.) meeting the selection criteria. The server system then displays on the client system a representative image of an object taken at the address of the at least one listing meeting the selection criteria. A representative image may be automatically displayed together with the listing itself. In one embodiment, the user may also be permitted to request a zoom-in view, a zoom-out view, a scrolled-to-the right view, or a scrolled-to-the-left view of the displayed image, so as to appreciate, for example, the neighborhood view of the area surrounding the listing of interest. Also, the user may be further permitted to obtain a 360-degree view in some selected locations, such as at intersections, depending on images available in the system. For example, the user may be permitted to click and drag a cursor on the displayed image itself to shift the viewpoint in any direction.

In accordance with another aspect of the present invention, a method for providing information regarding an object is provided. For example, information regarding an object, such as a business, may be provided via a graphical user interface. To provide information regarding an object, a location and a range surrounding that location (e.g., the current location of the user) is determined. Once a location and range have been determined, at least one object that is within that range is identified. Information for the identified object is displayed. Such information includes an image representative of the identified object. Additionally, a map is also displayed that includes an identifier of the location and an identifier of the identified object.

In accordance with another aspect of the present invention, a computer system having a computer-readable medium including a computer-executable program therein for performing a method for providing information regarding an object is provided. The method includes selecting an object and identifying a plurality of images related to the selected object. From those images, a representative image of the object is selected and displayed on a graphical user interface. The representative image may be a default representative image or a user specified representative image. In addition to displaying a representative image, the method also displays on the same graphical user interface at least one of the plurality of the identified images related to the object.

In accordance with still another aspect of the present invention, a computer-accessible medium is provided having instructions stored thereon that direct a computing system to: provide a plurality of images representative of an object; receive a user's vote for an image of the plurality of images; and select an image of the plurality of images with a majority of received votes as an image representative of the object. In particular, a user may vote on one of a plurality of images for a particular object, such as a business, and the system will tally all votes received. The image with the majority of votes may be identified as being the representative image for that object. The representative image may be used to visually represent the object to a user that has requested information about the object. As discussed below, the image may be an actual image of a front, or street view, of a building containing the object.

In accordance with yet another aspect of the present invention, a method for correlating a plurality of images having associated geographic locations with an address is provided. The method associates a geographic location with the address and defines a boundary surrounding the geographic location associated with the address. Images having an associated geographic location within the defined boundary are then correlated with the address.

In accordance with another aspect of the present invention, a computer system for defining boundaries surrounding street addresses, including a processor and memory, is provided. The computer system is configured to execute computer instructions that cause the processor to obtain geographic coordinates for a first street address and define a first boundary that includes the obtained geographic coordinates. Additionally, the computer instructions cause the processor to identify a second street address located on a same side of a street as the first street address and define for the second street address a second boundary. In particular, the second boundary may be defined to include a geographic area adjacent to the first boundary.

Accordingly, an online directory using the present invention may permit the user to visually appreciate not only the images of various listings (e.g., businesses) but also the neighborhood surrounding these listings.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is directed to a system and method for collecting and displaying images of objects (including, without limitation, buildings, structures, and store fronts) obtained at different geographic locations. The images may be displayed in association with corresponding listings in online directories. The following detailed description provides several exemplary implementations of the invention. Although specific system configurations and flow diagrams are illustrated, it should be understood that the examples provided are not exhaustive and do not limit the invention to the precise forms disclosed. Persons having ordinary skill in the field of digital data processing will recognize that the computer components and arrangements described herein may be interchangeable with other components and arrangements and that the process steps described herein may be interchangeable with other steps or their combinations, and still achieve the benefits and advantages of the present invention.

It should also be noted that while the following description is provided in the context of an online business directory (e.g., Yellow Pages) at which each business listing is associated with an image of its geographic location, the present invention can be applied to create and publish online residential directories (e.g., White Pages) in which each individual listing is associated with an image of its geographic location (e.g., an image of a house). Therefore, the term "Yellow Pages" as used herein may refer to other types of directories as well, including White Pages.

Figure 1:
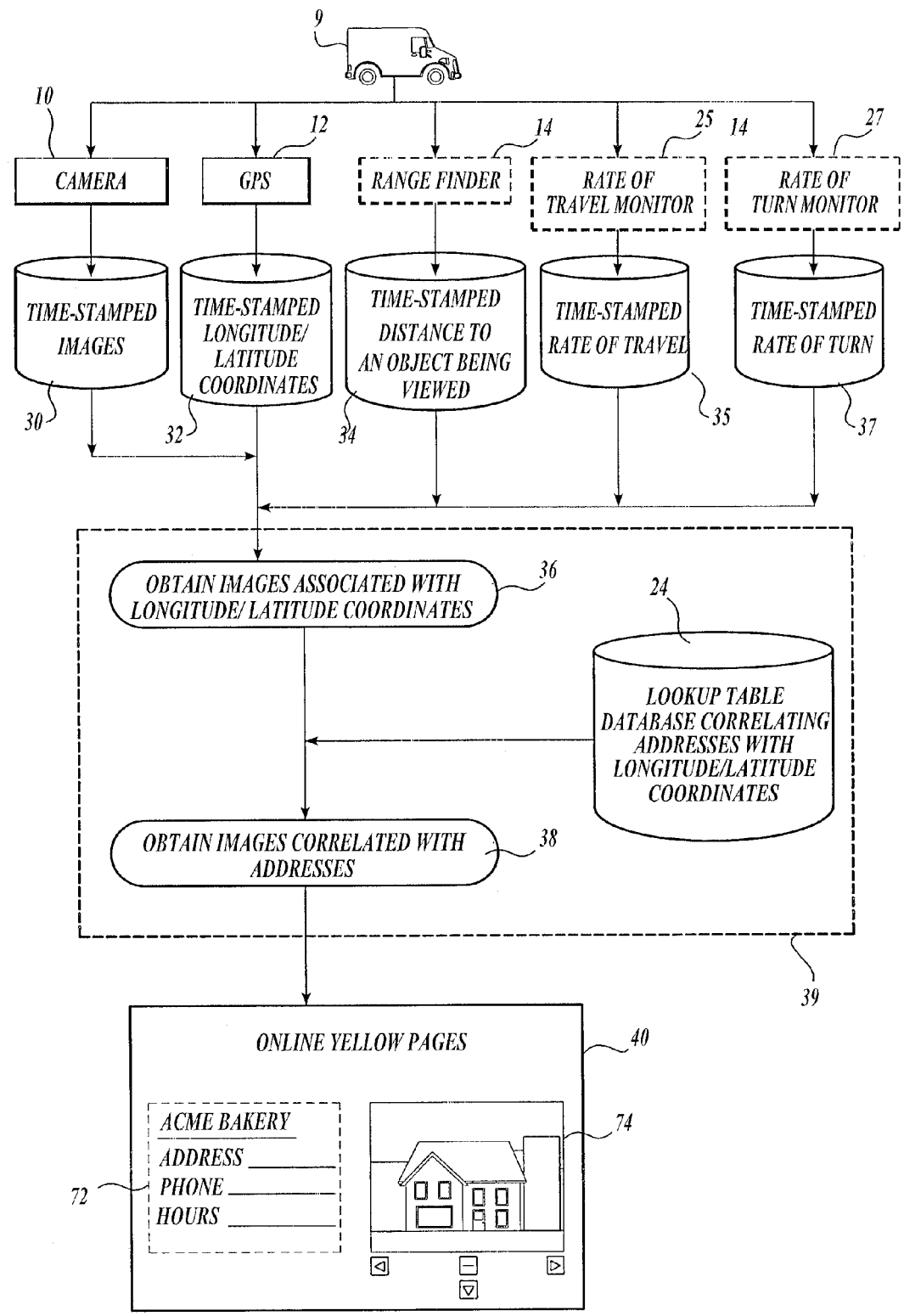
FIG. 1 is a pictorial flow diagram of one exemplary method for collecting address-correlated images of objects at geographic locations for publication in an online directory according to one embodiment of the present invention.

FIG. 1 illustrates an overall flow diagram of a method for collecting images of objects at geographic locations for publication in an online directory, at which each listing is associated with an image taken by a camera at the address in the listing. A system for collecting images (e.g., system 16 in FIG. 2) is mounted on a vehicle 9. The vehicle 9 may be an automobile, as illustrated, but may be of any other type apparent to one skilled in the art, such as a bicycle, bus, or airborne vehicle such as a manned or unmanned airplane. The image collection system, in this embodiment, includes at least one camera 10 and a GPS receiver 12. Optionally, a range finder 14, a rate of travel monitor 25, and a rate of turn monitor 27 may also be included in the system and mounted on the vehicle 9.

Figure 2:
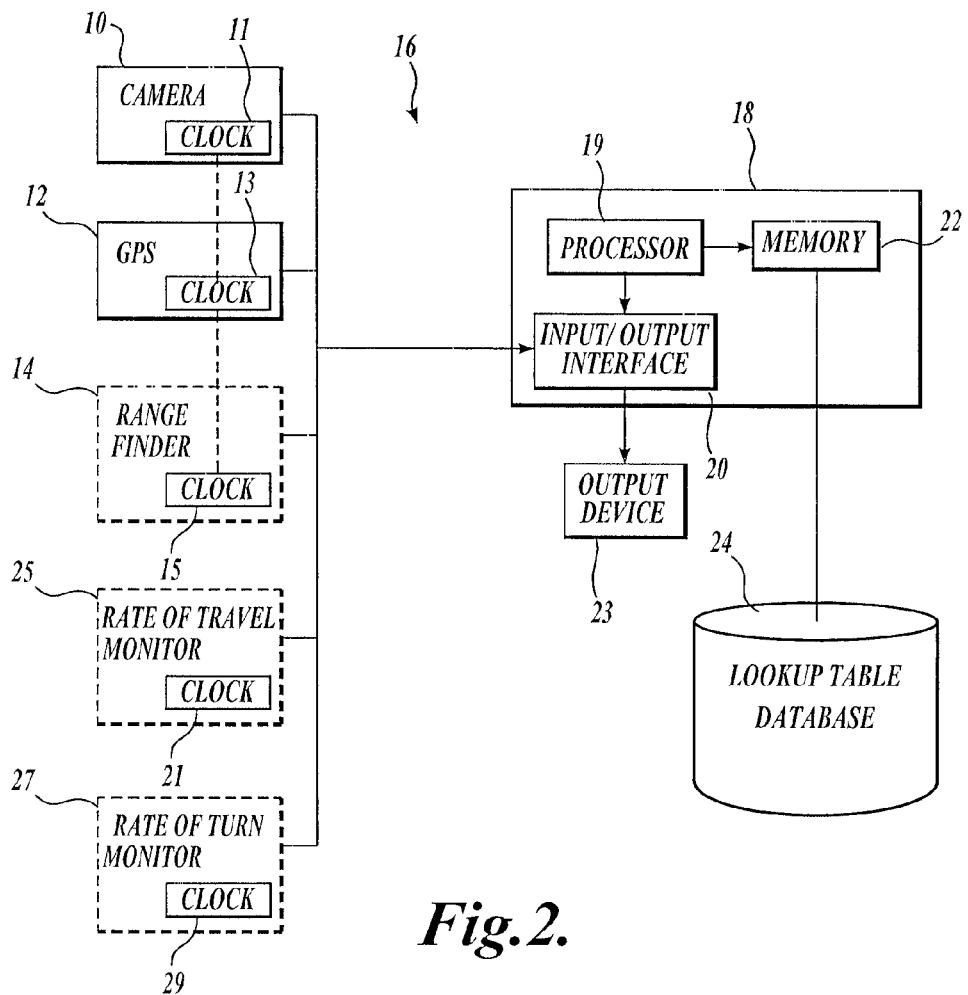
FIG. 2 is a functional block diagram of an exemplary system that may be used to collect images of objects at geographic locations.

FIG. 2 illustrates an embodiment of a system 16 suitable for collecting images of objects at geographic locations and correlating the images with street addresses for the geographic locations. The system 16 includes the camera 10, the GPS receiver 12, and perhaps the range finder 14, rate of travel monitor 25, and rate of turn monitor 27, each including or having access to a synchronized clock 11, 13, 15, 21, and 29, respectively. The clocks 11, 13, 15, 21, and 29 may be separate clocks that are synchronized with each other or, alternatively, a single clock to which the camera 10, the GPS receiver 12, the range finder 14, the rate of travel monitor 25, and the rate of turn monitor 27 are coupled for time reference. A synchronized clock may thus mean one or more clocks from which each of multiple devices can receive synchronized time information. The camera 10, the GPS receiver 12, the range finder 14, and rate of travel monitor 25 and rate of turn monitor 27, if provided, are coupled to a computing device 18, such as a laptop computer. In some applications where the data storage capacity of the camera 10, the GPS receiver 12, the range finder 14, the rate of travel monitor 25, and the rate of turn monitor 27 is sufficiently large, the computing device 18 need not be coupled to the camera 10, the GPS receiver 12, the range finder 14, the rate of travel monitor 25, and the rate of turn monitor 27 during image collection (e.g., while mounted on the vehicle 9).

The computing device 18 includes a processor 19 in communication with an input/output interface 20 and a memory 22. The input/output interface 20 enables the computing device 18 to communicate with various input and output devices. Input devices may include the camera 10, the GPS receiver 12, the range finder 14, the rate of travel monitor 25, and the rate of turn monitor 27, as illustrated, plus any other computing elements that provide input signals to the computing device 18, such as a keyboard, mouse, external memory, disk drive, etc.

Output devices 23 may include typical output devices, such as a computer display, printer, facsimile machine, copy machine, etc. The processor 19 is configured to operate in accordance with computer program instructions stored in a memory, such as the memory 22. Program instructions may also be embodied in a hardware format, such as one or more programmed digital signal processors. The memory 22 may also be configured to store various data (e.g., image data, geographic location data, and speed data) collected and processed, as will be more fully described below. In some applications, the data obtained by the camera 10, the GPS receiver 12, and the range finder 14 (if provided) are sent directly to a hard drive (forming part of the memory 22) of the computing device 18 for storage, instead of being first stored in video tapes or removable disks. The memory 22 may include, for example, a lookup table database 24 that stores address data in correlation with geographic locations (e.g., longitude and latitude coordinates). Suitable lookup table databases are routinely used for the purpose of creating maps and are commercially available. Those having ordinary skill in the art of computers will recognize that a wide selection of commercially available components and arrangements can be used to construct a system, such as the system 16 illustrated in FIG. 2. In particular, the computing device 18 may include additional conventional components, such as a network interface, which are not illustrated herein for the purpose of clarity.

Referring back to FIG. 1, once the camera 10, the GPS receiver 12, and perhaps the range finder 14, rate of travel monitor 25 and/or rate of turn monitor 27 are mounted on the vehicle 9, an operator drives the vehicle while automatically, or perhaps manually (with the aid of another operator), capturing a series of images of objects (e.g., building or store fronts) on each side of the street using the camera 10. In some applications, for example when the street width is sufficiently narrow or the street is relatively quiet, two cameras 10 may be mounted on the vehicle facing opposite directions so as to simultaneously take two series of images covering both sides of the street. In other applications, three or more cameras 10 may be mounted on the vehicle. For example, two or more cameras 10 may be mounted on the same side of the vehicle (for example, two on one side and two on the other side) to collectively obtain a stereoscopic image of each object being imaged. Any suitable auto-focus camera(s) 10 may be used, as will be apparent to one skilled in the art, though preferably the camera 10 would be a digital still camera or a digital video camera. If a digital still camera is used, the series of images taken will be still images. If a digital video camera is used, the series of images taken will be image frames that collectively form a video image. In any case, the camera 10 preferably time-stamps each image, i.e., records the time each image (or each image frame) is taken, in reference to a synchronized clock 11. Time-stamping is a standard feature of commercially available cameras.

As the camera 10 captures images of objects at geographic locations (e.g., businesses), the GPS receiver 12 records the geographic locations (e.g., longitude and latitude coordinates) while preferably time-stamping the recorded location data. The camera 10 and the GPS receiver 12 may be positioned or programmed relative to each other (e.g., by offsetting the distance therebetween) such that the geographic location determined by the GPS receiver 12 can be treated as that of the camera 10 itself. The rate of travel monitor 25, if used, records the rate of travel of the vehicle 9 as data is being collected while preferably time-stamping such information. As discussed below, the rate of travel information may be used to assist in filtering images or in determining the geographic coordinates of an image. Similarly, the rate of turn monitor 27, if used, records the degree of any turns made by the vehicle 9 as data is being collected while preferably time-stamping such information. For example, the rate of turn monitor 27 may be a gyroscope mounted on the vehicle 9, and the resistance incurred by the gyroscope during a turn may be used to calculate the degree of the turn made. Calculating and recording the degree of a turn may be used in conjunction with the rate of travel information recorded by the rate of travel monitor 25 to determine the geographic coordinates of an image of GPS data is not available.

The range finder 14, if used, records the distance to an object being viewed by the range finder 14 while preferably time-stamping such distance information. The range finder 14 may also be positioned or programmed relative to the camera 10 and the GPS receiver 12 such that the distance information determined by the range finder 14 can be treated as that of the camera 10. Any suitable GPS receiver and range finder may be used, as will be apparent to one skilled in the art. For example, some high-precision GPS receivers suitable for use in the present invention are available from Trimble Navigation Ltd. of Sunnyvale, Calif. (www.trimble.com). A line of laser range finders suitable for use in the present invention is available from Measurement Devices Ltd. (MDL) of Scotland, U.K. (www.mdl.co.uk).

Figure 3:
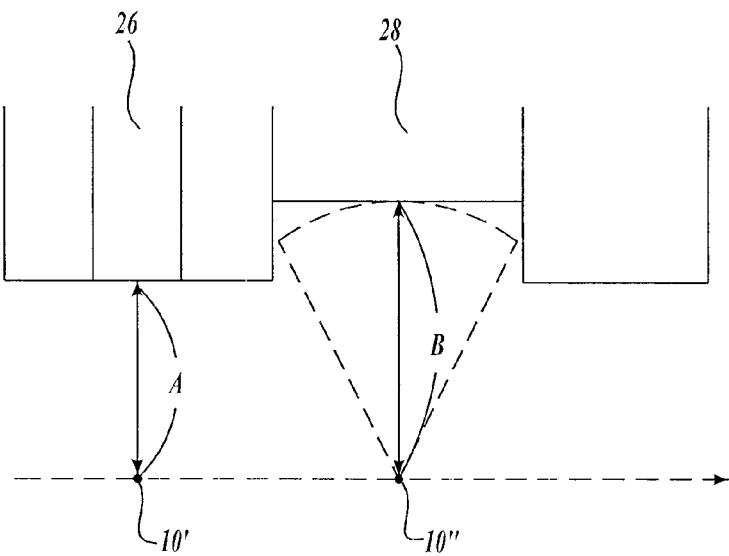
FIG. 3 is a schematic diagram illustrating distance offsetting between a camera and an object being imaged by the camera.

The range finder 14 is useful in offsetting the distance between the GPS receiver 12 (geographically coinciding with the camera 10 and the range finder 14) and the object being imaged by the camera 10, so as to more accurately determine the precise geographic location of the object being imaged. Specifically, referring to FIG. 3, when a camera 10 mounted on a vehicle is moved from position 10' to position 10" with the movement of the vehicle, the distance from the camera to the object being imaged changes from distance A (to building 26) to distance B (to building 28). If the distance from the camera 10 to the objects being imaged by the camera 10 is substantially constant, a standard offset (e.g., distance A) may be used to calculate the longitude/latitude coordinates (i.e., geographic location) of the objects being imaged. If, on the other hand, this distance varies substantially, or if it is preferred to precisely calculate the longitude/latitude coordinates of the objects being imaged, the range finder 14 may be used to continuously measure this distance. The direction of the field of view of the camera 10 may be determined by a compass (not shown) or based on the direction of the movement of the camera 10 carried by the vehicle (e.g., from position 10' to position 10" in FIG. 3) as determined by the GPS receiver 12. An angle of the camera 10 relative to the moving direction of the vehicle is known and may be used to further determine the direction of the camera 10 relative to the objects being imaged.

Sometimes the vehicle 9 must travel on inclines. Since buildings are built perpendicular to the earth, with the camera 10 being mounted level to the vehicle 9, the images captured by the camera 10 appear tilted. To overcome this problem, a gyroscope can be used with the camera 10 mounted on a gimbal. A suitable gyroscope-based mounting system (or a stabilizer) can be obtained from Kenyon Laboratories, L.L.C. of Essex, Conn. (www.ken-lab.com). The gyroscope-based mounting system, in an embodiment of the present invention, may use the same gyroscope used to gather data for the rate of turn monitor 27. Alternatively, separate gyroscopes may be used. Another approach for solving the problem of images appearing tilted is to use a digital inclinometer to track an angle of the camera 10 relative to a level and then rotate the images in software during post-capture processing to compensate for the measured tilt-angles.

To collect images and geographic locations of numerous businesses, many vehicles may be used, each equipped with a camera and a GPS receiver. In order to efficiently collect images and geographic location data of businesses in remote or isolated areas, certain utility vehicles, such as U.S. Postal Service delivery vehicles or taxi cabs, may be requested to carry a data collection system of the present invention.

Referring back to FIG. 1, the camera 10 therefore produces a set of time-stamped image data 30, the GPS receiver 12 produces a set of time-stamped geographic location data 32 (e.g., longitude and latitude coordinates), the range finder 14 produces a set of time-stamped distance information data 34, the rate of travel monitor 25 produces a set of time-stamped rate of travel information data 35, and the rate of turn monitor 27 produces a set of time-stamped rate of turn information data 37. These sets of data may be downloaded to the computing device 18 (see FIG. 2) and associated with each other based on their respective time-stamps so as to associate each image with a geographic location of the object featured in the image, as indicated at block 36 in FIG. 1. The data download to the computing device 18 may occur continuously (e.g., at the same time as the data is collected by the camera 10, the GPS receiver 12, the range finder 14, and the rate of travel monitor 25) or in batches (e.g., after a certain volume of data is collected by the camera 10, the GPS receiver 12, the range finder 14, the rate of travel monitor 25, and the rate of turn monitor 27).

Alternative methods of associating image data with geographic locations are encompassed by the invention. For example, instead of relying on synchronization of the clocks 11, 13, 15, and 21 of the respective devices, the devices may be coupled to each other so that, for example, image taking of the camera 10 instantaneously triggers the GPS receiver 12 and the range finder 14 to record the geographic location and the distance information at that location and the data are recorded together as a unit. Alternatively, geographic location recording of the GPS receiver 12 (or another controller triggered by the geographic location recording of the GPS receiver 12) triggers the camera 10 to take an image. For example, the longitude/latitude coordinates of selected businesses whose images are to be taken (available from the lookup table database 24) may be input to the GPS receiver 12 coupled to the camera 10. Each time the GPS receiver 12 determines it is located in front of a selected business, the GPS receiver 12 records the geographic location and triggers the camera 10 to record an image of the business. In this way, only those images capturing listed business addresses will be taken. The foregoing description is not exhaustive and other methods for associating images with geographic locations may be used, as will be apparent to one skilled in the art.

While components of the system 16, such as the camera 10, the GPS receiver 12, the range finder 14, the rate of travel monitor 25, and the computing device 18, may be individually configured and assembled as described above, alternative systems may employ various commercially available geographic information systems (GIS) that are typically used for surveying and mapping. Typically, a geographic information system is a combination of elements (including both hardware and software) designed to collect, manipulate, store, and display geographic data. For example, Red Hen Systems, Inc., of Fort Collins, Colo. (www.redhensystems.com), offers add-on GPS receivers sold under the trademark of VMS 200™ and VMS Mobile™ that can be used with an off-the-shelf digital video camera to embed GPS data on the video recording. Similarly, Measurement Devices Ltd. (MDL) of Scotland, U.K. (www.mdl.co.uk), offers an add-on GPS module sold under the trademark of VideoAce® that can be combined with any video camera to collect video still images and movies that are referenced with GPS data. Using these devices, one can readily collect a series of images that are referenced with their geographic locations (longitude and latitude coordinates). Note that use of these systems combining the GPS receiver and the camera eliminates the need to synchronize clocks in various components (the camera 10, the GPS receiver 12, etc.).

According to one aspect of the present invention, only a subset of the entire set of obtained images (video image frames, or still images) may be selected and used so as to minimize both gaps and overlaps. For example, when a video camera is set to take 30 frames per second, only frames every X feet (depending on the rate of travel of the video camera) are selected to minimize both frame gaps and frame overlaps. Alternatively, or in addition thereto, every X frame may be selected to further minimize both frame gaps and frame overlaps. Still further, in another embodiment, a subset of images may be obtained by comparing adjacent images and retaining those images that are sufficiently different, based upon a predetermined threshold, from one another.

Sometimes, signals from the GPS satellites may become too weak to permit the GPS receiver 12 to calculate its geographic location. For example, the GPS receiver 12 may not function well when it is placed without a clear view of a wide sky (e.g., in cities with tall buildings, under trees with a thick canopy, etc.). Also, there may be limitations on the logging rate of the GPS receiver 12 (e.g., most GPS receivers currently permit only one geographic location recordation per second). In accordance with the present invention, interpolation of the geographic location information, rate of travel information and rate of turn information, if gathered, is used to overcome the GPS signal loss issues and/or the limitations on the GPS logging rate. Specifically, using any two geographic locations recorded by the GPS with time-stamps ("logged locations"), the rate of travel (if unknown) and also the direction of travel can be calculated. Then, the geographic location (e.g., longitude and latitude coordinates) of any point between the two logged locations can be calculated using interpolation based on the rate of travel and the direction of travel. Additionally, if rate of turn information was gathered, any turns between the two geographic locations recorded by the GPS may be determined. Additionally, the logged locations can be overlaid onto existing maps showing streets, which define feasible regions (routes) of image capture along which the vehicle 9 carrying the camera 10 could have passed. In other words, the streets indicate feasible (valid) paths along which the geographic locations calculated based on interpolation can fall. For example, if a map shows a building, any interpolated geographic location (between two logged locations) that falls "inside" the building is invalid as showing the possible location of the camera 10 because the vehicle 9 carrying the camera 10 could not have driven "through" the building. Therefore, by overlaying the logged locations to existing maps of streets, which provide feasible regions to verify the validity of any geographic location calculated based on interpolation, one can reduce or eliminate interpolation errors. Accordingly, using the interpolation method, perhaps as assisted by the map-overlaying method, a geographic location of any image can be calculated even when such a geographic location cannot be directly obtained using the GPS receiver 12.

In some cases, it is preferable to use a GPS receiver having a relatively higher refresh rate so as to reduce the need for interpolation. For example, while most commercially available GPS receivers currently permit only one geographic location recordation per second, a GPS receiver and its associated software may be configured to obtain more than one geographic location recordation per second.

Next, as indicated in block 38 of FIG. 1, the computing device 18 correlates each image (already associated with a geographic location) with an address by referring to a lookup table database 24 that stores addresses in correlation with their longitude and latitude coordinates. Alternatively, a suitable algorithm for deriving an address based on a geographic location (e.g., longitude and latitude coordinates) may be used, such as the algorithm supported by "Geocoding Server" available from MapQuest™. Such an algorithm uses a series of logics to estimate an address based on longitude/latitude coordinates, such as a block numbering system, a position within a sequence of addresses on a block (e.g., 1002 is the second of 10 addresses on a block so it is likely to be at 20% of the block distance from the corner), and the odd/even numbering system to indicate a particular side of each street. Based on the estimated location of an address derived from an algorithm, images having coordinates near the estimated location may be correlated with that address. In addition, as discussed in more detail below with respect to FIGS. 5 and 14, a boundary surrounding the estimated location of each address may be defined and images within that boundary may be correlated with that address. Further details regarding the process 39 (comprising steps 36 and 38 of FIG. 1) for manipulating data collected by the camera 10, the GPS receiver 12, and the range finder 14 are provided in reference to FIGS. 4 and 5.

After the series of images are correlated with addresses in block 38, the address-correlated images may be used in publishing an online directory 40 at which each listing 72 (FIG. 1) can be displayed together with an actual image 74 of the address in the listing. In particular, one of the correlated images may be selected as a representative image, or best image, for the address. For example, if there are several images correlated with an address, the correlated image with geographic coordinates that are the closest to the geographic coordinates of the address may be selected as the representative image for that address. Alternatively, as discussed in more detail below, images may be voted on by users and an image with the most votes may be selected as the representative image for an address. The publication and operation of an online directory will be more fully described below.

Figure 4:
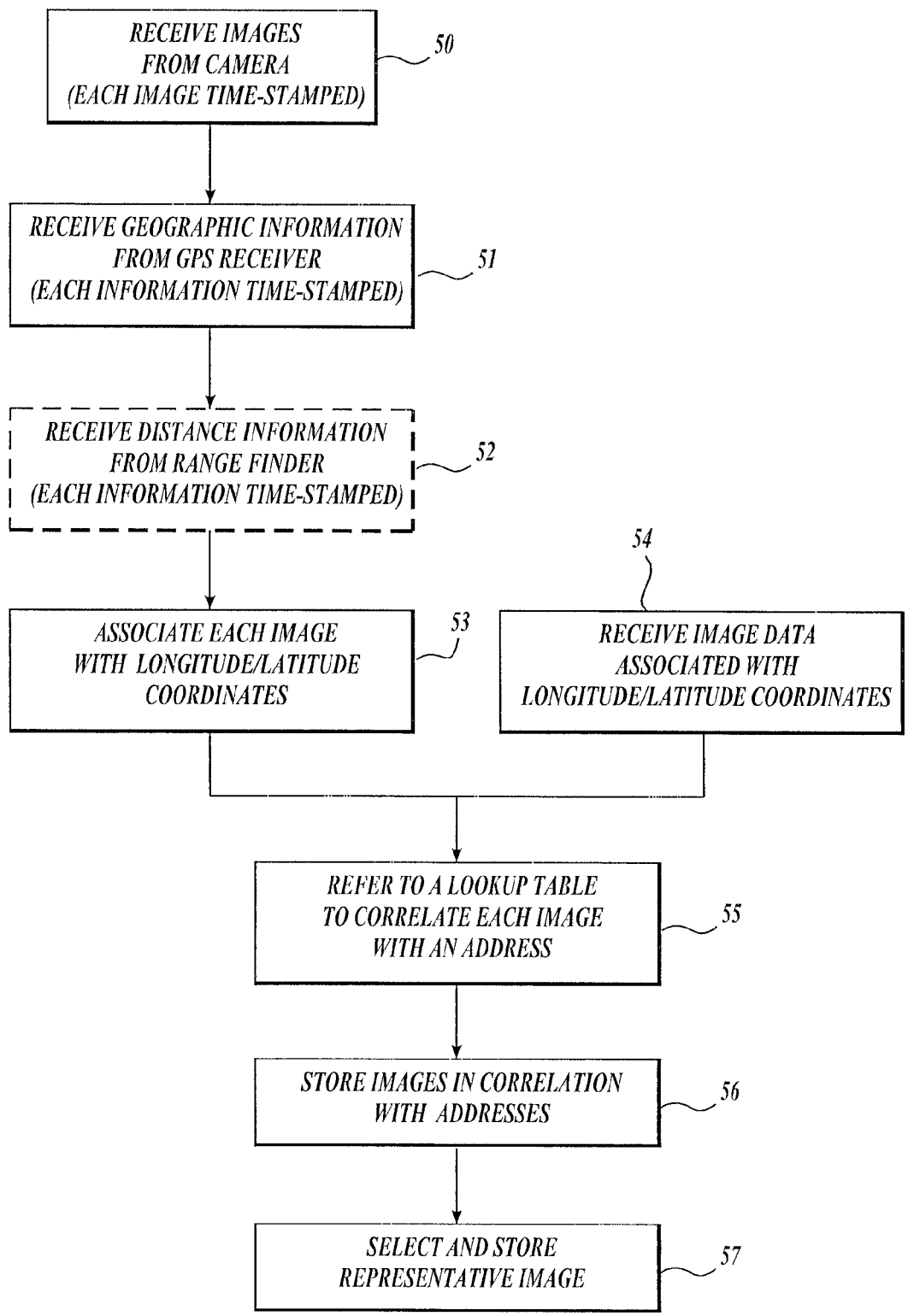
FIG. 4 is a flow diagram of one exemplary method for preparing images of objects collected at geographic locations for publication in an online directory according to one embodiment of the present invention.

Referring now to FIG. 4, a method of manipulating the data collected by the camera 10, the GPS receiver 12, and the range finder 14, for producing address-correlated image data is described. In block 50, images of objects (e.g., business structures) taken by the camera 10 are received wherein each image is time-stamped. In block 51, a series of geographic locations (longitude and latitude coordinates) that are also time-stamped are received from the GPS receiver 12. In block 52, if the range finder 14 is used, a series of time-stamped distance information obtained by the range finder 14 is received. In block 53, the image data, the longitude and latitude coordinate data, and the distance information (if obtained), are all associated with each other based on their respective time-stamps, to thereby associate each image with the particular latitude/longitude coordinates of the object featured in the image. As described above, only a subset of the entire set of images may be selected and used to minimize gaps and overlaps. Also as described above, when the geographic locations of certain images cannot be obtained directly from the GPS receiver 12, those locations can be calculated based on interpolation. Thereafter, in block 55, each image is correlated with an address. Multiple images may be correlated to the same address. Likewise, the same image may be correlated to multiple addresses. Correlation may be accomplished in any suitable manner, such as by assigning a corresponding address to each image, or by assigning a common identification number to each image and its address.

In block 56, each image is stored in correlation with its address. Note that, if a specialty mapping/surveying device that produces image data already embedded with GPS data is used, as described above, then blocks 50-53 may be replaced with a single block 54 at which such GPS data-referenced image data is received. As before, at this time, only a subset of the entire set of images (or image frames) captured by the camera 10 may be selectively received to minimize gaps and overlaps, and also, any geographic locations not directly obtainable from the GPS receiver 12 may be calculated based on interpolation. Thereafter, as before, the images are correlated in block 55 with addresses in reference to the lookup table 24, and the address-correlated images are stored at block 56.

Figure 6:
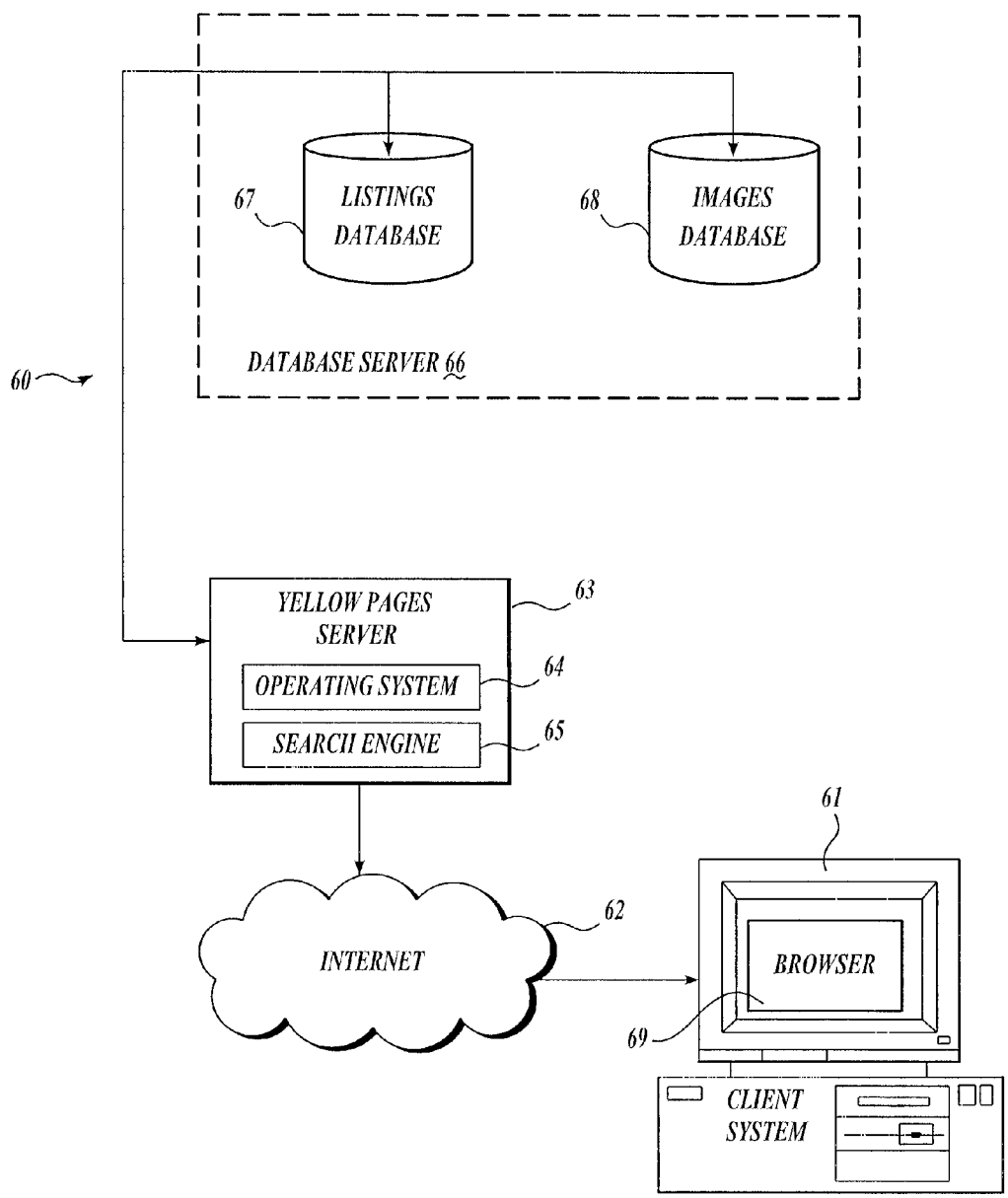
FIG. 6 is a block diagram showing an environment and arrangement of certain computing components for implementing an online directory according to one embodiment of the present invention.

Regardless of whether the system utilizes the process described with respect to block 50-53, or utilizes images already embedded with GPS data, as illustrated by block 54, the images may be correlated to addresses based on a boundary defined for each address. In one embodiment, address coordinates may be estimated using an algorithm, such as the algorithm supported by "Geocoding Server" available from MapQuest™. Alternatively, the total number of addresses on one side of a block may be determined and boundaries defined for each address that equally divide the block between addresses. In another embodiment, the block may be geographically divided based on an estimated size of the structures at each address. The estimated size of the structure and the estimated location of the address may be determined based on the number of addresses on a block in conjunction with the types of businesses, and/or number of businesses, occupying those structures. Business types may be obtained from a listings database 67 (FIG. 6). For each address boundary, regardless of what technique is used to define the boundary, all images associated with longitude/latitude coordinates within that boundary may be correlated to that address.

Figure 5:
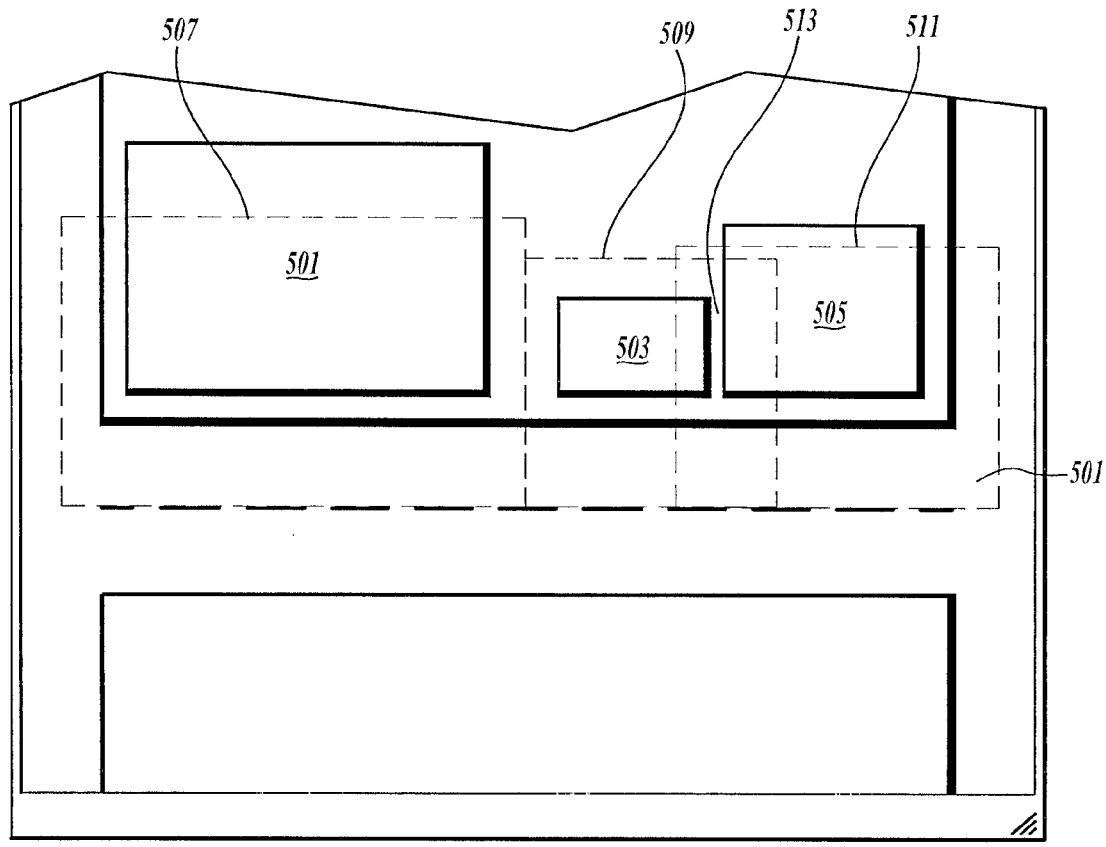
FIG. 5 is a block diagram showing a street block having three addresses, each of which has a defined boundary for which images may be correlated, in accordance with an embodiment of the present invention.

Referring to FIG. 5, if one side of a block 501 has three addresses 501, 503, 505 and it is known that the structure at address 501 contains a grocery store (i.e., it is likely a large structure), the structure at address 503 contains a shoe repair store (i.e., likely a small structure), and the structure at address 503 contains a convenience store (i.e., it is likely a medium size structure), the geographic area of the block may be divided based upon an estimated size of the structures at each address. Thus, for each address a boundary may be defined that encompasses the estimated size of the structure located at that particular address. For example, a large boundary 507 may be defined for the grocery store located at address 501, a small boundary 509 may be defined for the shoe repair store 503, and a medium size boundary may be defined for the convenience store 505.

A boundary defined for an address may be any shape and size, and the example of a rectangle illustrated in FIG. 5 is utilized for explanation purposes only. As will be appreciated, any other shape such as a circle, square, polygon, etc., may be used to define a geographic area surrounding an address. Additionally, boundaries may be defined such that they overlap one another, thereby allowing images falling within both boundaries to be assigned to multiple addresses. For example, boundaries 509 and 511 are defined such that they overlap 513. All images having associated longitude/latitude coordinates within the overlap 513 may be assigned to both address 503 and address 505. Overlapping boundary definitions ensures that all images obtained for a particular block are correlated to at least one address. Alternatively, boundaries may be defined for addresses such that there is no overlap. Defining boundaries for addresses increases the range with which images may be identified for correlation, thereby potentially increasing the number of images correlated to an address.

Returning to FIG. 4, in addition to correlating images for addresses, for each address, one image may be selected and stored as a representative image for that address, as illustrated by block 57. As discussed in more detail below, a representative image for an object may be displayed to a user as part of an address listing. For example, referring briefly to FIG. 7, for each address included in the address listing 707, a representative image, such as image 727, is provided. The representative image may be, for example, an image of the store front of the business. The representative image may be selected in a variety of ways. For example, the image with longitude/latitude coordinates that are nearest the longitude/latitude coordinates of the address, obtained from the lookup table 24, may be identified as the representative image for that address. As will be described in more detail below, the representative image, also referred to herein as the "best image," may be adjusted based on user input. For example, users may vote as to which of the images correlated with an address should be the representative image for that address. Those votes may be compiled and the image with a majority of the votes may be selected and stored as the representative image. Alternatively, a user, such as a business owner, may upload an image that is to be used as the representative image for an address. Allowing users to provide input (e.g., votes or images) for the representative image for an address and adjusting the representative image based on that input allows the system to improve its accuracy as to the images displayed in an online directory. In yet another example, the representative image may be selected by determining which of the correlated images is the best quality (e.g., clearest) image. Alternatively, the representative image may be the correlated image that was taken most recently in time. In another embodiment, a representative image may be selected based on the current season. For example, if it is the Christmas season, a representative image taken of the business during Christmas time may be selected. Alternatively, if it is summer, an image of the business taken during the summer may be selected as the representative image. As will be appreciated by one of skill in the relevant art, there are numerous ways for selecting a representative image and those mentioned above are only provided as examples. Any representative image selection technique may be used with embodiments of the present invention. Adjusting the representative image and other correlated images based on user input will be described in more detail with respect to FIGS. 8-13.

Address-correlated images, as described above, may be published in an online directory in accordance with the present invention. FIG. 6 illustrates one environment for implementing an online Yellow Pages that includes a Yellow Pages system 60 and one or more client systems 61 (only one is shown), such as personal computers and PDAs, that individual users can use to communicate with the Yellow Pages system 60. In the environment shown in FIG. 6, the client systems 61 communicate with the Yellow Pages system 60 via wired or wireless connections to one or more computer networks, such as the Internet 62. Protocols and components for communicating via the Internet are well known to those of ordinary skill in the art of computer network communications. The client system 61 requests and retrieves information from the Yellow Pages system 60 via a Web browser application 69 that provides the user with a graphical user interface to the Internet, as is also well known to those of ordinary skill in the art.

The Yellow Pages system 60 depicted in FIG. 6 operates in a distributed computing environment comprising several computer systems that are interconnected via communication links, e.g., using one or more computer networks or direct connections. However, it will be appreciated by those of ordinary skill in the art that the system 60 could equally operate in a computer system having fewer or greater number of components than are illustrated in FIG. 6. Thus, the description of the Yellow Pages system 60 in FIG. 6 should be taken as exemplary and not limiting to the scope of the invention. In particular, the Yellow Pages system 60 may comprise plural subsystems, each for performing a specific function in response to a request from a client system.

The Yellow Pages system 60 as illustrated includes both a Yellow Pages server 63 having an operating system 64 and a search engine 65, and a database server 66 having a listings database 67 and an images database 68. The Yellow Pages server 63, in this example, is a Web page server that supports an online Yellow Pages Web site on which each listing (e.g., business) can be displayed together with an image correlated with the listing. The Yellow Pages server 63 communicates text and graphics organized as a Web page using, for example, hypertext transfer protocols, in response to requests and search queries received from the client systems 61. The Yellow Pages server 63 also conducts searches of the databases 67 and 68 in the database server 66. The administration and overall operation of the Yellow Pages server 63 is controlled by its operating system 64, while its search function is performed by the search engine 65 in cooperation with the database server 66.

The database server 66 maintains the listings database 67 and the images database 68 that the Yellow Pages server 63 uses to respond to user requests and search queries. The listings database 67 contains information generally found in conventional Yellow Pages in a searchable form, i.e., numerous listings (business names together with their addresses, phone numbers, business type, etc.) searchable by their business names, addresses, phone numbers, business types, etc. The listings database 67 may also contain information such as the business hours, a brief description or profile, customer reviews, etc., of each business listed. The images database 68 contains digitized images of the businesses in correlation with the business addresses stored in the listings database 67. The database server 66 is configured to receive search instructions from the search engine 65 and return search results from the listings database 67 and the images database 68. Those of ordinary skill in the art will recognize that the Yellow Pages server 63 and the database server 66 will each typically employ a memory and main processor in which program instructions are stored and executed for operation of the servers.

The Yellow Pages system 60 enables a user to search and view online Yellow Pages in which each listing (e.g., business) is displayed with a representative image of an object (e.g., business building) taken at the geographic location of the business. Additionally, the online Yellow Pages may also include a street map identifying the location of each listing. FIGS. 7, 8, and 9A-9E illustrate sample graphical user interfaces, provided in the form of Web pages that can be displayed on the client system 61 in response to user requests and search queries.

Figure 7:
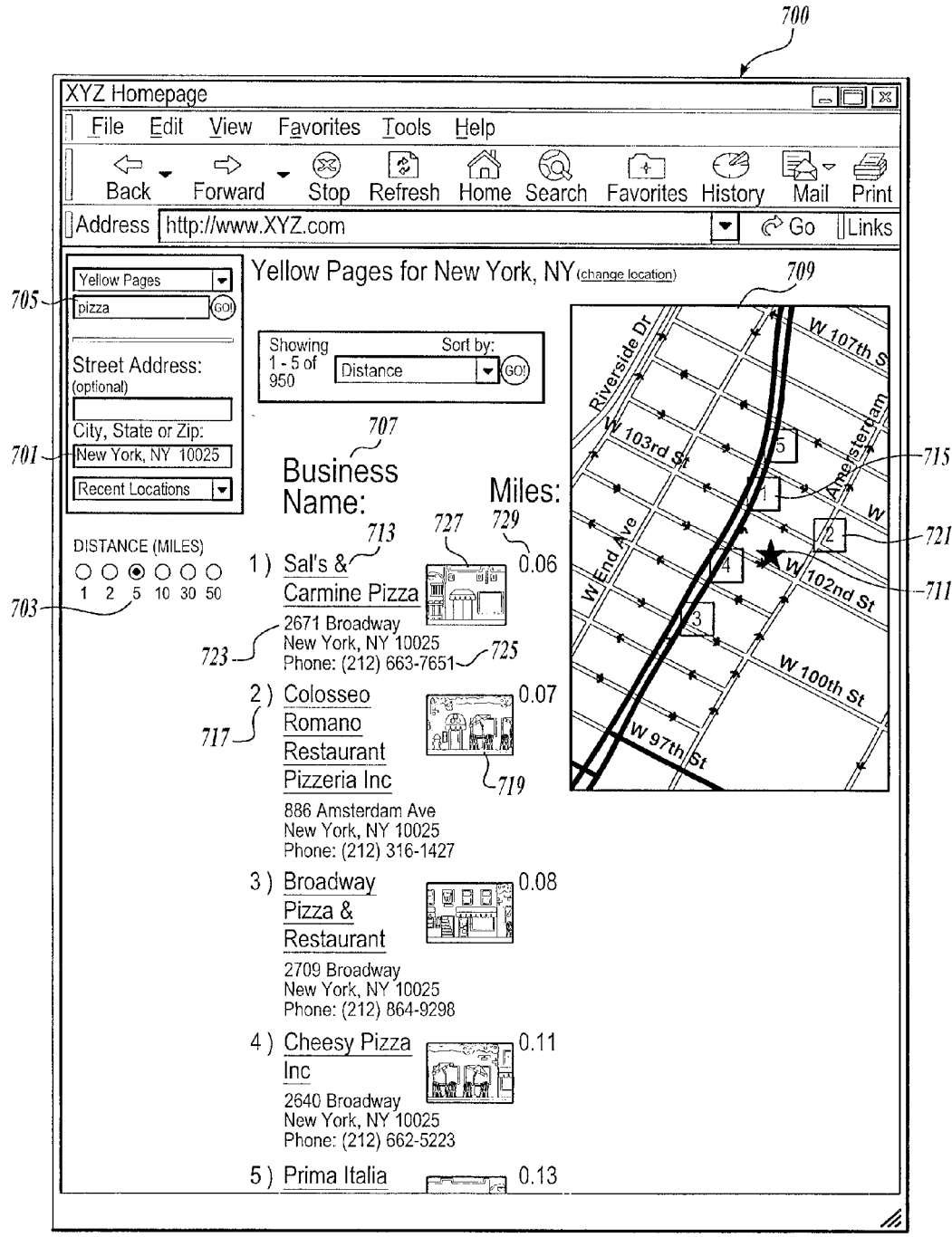
FIG. 7 is a pictorial diagram of a graphical user interface displaying an example of a listings page returned to a client system when a user requests to view the listings matching a search criteria, generated using embodiments of the present invention.

FIG. 7 illustrates a listings page 700 returned to a client system 61 when the user requests to view the listings for "pizza" 705 surrounding a particular location, in this example, "New York, N.Y. 10025" 701. The location for which the search is to be performed may be provided by a user submitting limitations (e.g., city, state, or zip code) or based on known user preferences, such as the user's home or work address. Additionally, a user may specify the distance 703 from the location 701 for which the search is to be performed.

The listings 707 matching the search criteria are presented in the listings page 700. Each listing includes the name of the business, such as "Sal's & Carmine Pizza" 713, the address of the business, such as "2671 Broadway, New York, N.Y. 10025" 723, the phone number of the business, such as "(212) 663-7651" 725, a representative image 727 of the business, and the distance 729 of the business from the user specified location. The display of a business listing is described in more detail with respect to FIGS. 9A-9E. The representative image may be one of the images previously correlated with the address in the listing (i.e., an image of the actual structure containing the business), the images either being previously taken or provided (e.g., uploaded) by a user. Additionally, the representative image may be a user-specific representative image (i.e., an image identified by the user performing the search as the preferred representative image). Alternatively, the image may be any image associated with the business, selected randomly or based on some other criteria.

The listings 707 may be organized based on any number of criteria. For example, the listings 707 may be organized by distance from the user specified location or alphabetically by business name. As will be appreciated by one of skill in the relevant art, the listings may be organized in any manner. The listings page 700 may also be configured to present all results matching the search criteria or a subset of the results with a link to additional pages containing additional matching results.

The listings page 700 may also include a street map 709 identifying the user specified location 711, and the location of each the businesses identified in the listing 707. For example, "Sal's & Carmine Pizza" 713 included in the listing 707 as the first item is identified in the street map 709 with a corresponding graphical icon, or identifier 715. The identifier may by the number of the business as included in the listing 707, an image of the structure in which the business is located, the trademark of the business, or any other identifier of the business.

The identifier 715, as well as each of the business names and corresponding images in the listing 707, may be interactive. For example, if a user positions a pointing device, such as a mouse pointer, over the business name or image included in the listing 707 the corresponding identifier included in the map 709 may be emphasized. Likewise, if a user positions a pointing device over an identifier, the corresponding business and image in the listing 707 may be emphasized. An identifier or listing may be emphasized by highlighting, changing the color, changing the size, changing the shape, or performing any other form of visual alteration on the identifier, image, or business name to thereby distinguish it from other material included on the listings page 700. For example, if a user positions a mouse pointer (not shown) over the business name "Colosseo Romano Restaurant Pizzeria Inc." 717, or over the corresponding image 719, the identifier 721 on the map 709 may be highlighted, thereby visually distinguishing the identifier 721 from the street map 709 and the other identifiers included on the street map 709.

In addition to the business names, corresponding images, and identifiers being interactive in that they may be emphasized, selection of any one of the business name, corresponding image, or identifier may result in a listing detail page 800 (FIG. 8) providing additional information about the selected business. A listing detail page 800 may also be presented in response to a user providing search criteria that results in only a single match. For example, if a user searches for "World Famous Ray's Pizza" in New York, N.Y., the listing detail page 800 may be presented instead of the listings page 700 (FIG. 7) as the results only returned one match.

For a selected business, a variety of information may be included in the listing detail page 800. For example, information such as the business name 801, business address 803, business telephone number 805, the representative image for the business 807, and a street map 809 identifying the location of the business may be displayed. Initially, the representative image may be the same representative image presented in the listings page 700 for the address. However, as described below, through interaction with the listing detail page 800, a user may alter the image that is presented as the representative image. As an example, for the representative image 807, the listing detail page 800 may include a "zoom in" icon 810, a "walk to the left" icon 813, and a "walk to the right" icon 815, any of which may be selected by a user to request a specific operation through the browser application 69 of the client system 61. Selection of the "walk to the left" icon 813 or "walk to the right" icon 815 may result in a different image, such as the geographically adjacent correlated image, being presented as the representative image.

A secondary group of correlated images 811 may also be included in the listing detail page 800 identifying other images that have been correlated with the address of the business 801 identified on the listing detail page 800. In one example, the secondary group of images may be presented in a filmstrip-type view by ordering and displaying the images in a geographic sequence. For example, the filmstrip-type view of secondary images 811 may include six images 817, 819, 821, 823, 825, and 827. However, any number of images may be displayed. Additionally, in another embodiment, the images may be ordered and displayed based on the time at which the images were taken. Additionally, the images presented as the secondary images may be selected based on the season. For example, if the current season is fall, the secondary images presented may be images correlated with that address which were taken in the fall.

Each of the secondary group of images 817-827 may be interactive in that a user may position a pointing device, such as a mouse pointer, over one of the images and that image will temporarily replace the representative image 807. Additionally, the secondary group of images 811 may also include a "walk to the left" icon 832 and a "walk to the right" icon 834, allowing a user to view additional correlated images to the left or right of the business identified in the listing detail page 800. For example, if a user selects "walk to the right" icon 834, the next geographic image correlated with the business would be displayed in the secondary set of images 811. Still further, the secondary group of images 811 may include a "scroll to the left" icon 831 and a "scroll to the right" icon 833, allowing a user to view the next set of correlated images to the left or right of the currently displayed set of images. For example, if a user selects "scroll to the left" icon 831, six new images are displayed as the correlated images 811. The six new images displayed are the six images that are geographically to the left of the current set of displayed correlated images.

Still further, in an embodiment of the present invention, a user may specify, or vote, which image of the secondary group of images 811 they perceive as being the appropriate representative image for the business identified in the listing detail page 800. For example, a user may specify that image 823 is the appropriate representative image for the business "World Famous Ray's Pizza" 801 because the image includes a centered view of the structure containing "Ray's Pizza." Such selection, or voting, may be accomplished by a user selecting (or clicking) the best image box 835 under the image 823. In response to a selection by a user of a representative image, the system 60 stores that image as the user's own personal choice of the representative image for that business at that address. If the user, at a later time, uses the system 60 and obtains information for "World Famous Ray's Pizza," either in a listings page 700 or listing detail page 800, the user selected image will be presented as the representative image. Additionally, the user's vote for that particular image as the best image is saved with respect to that image and the corresponding business address and used to determine what image should be used as a default representative image for the business. A default representative image is provided as the representative image for a business to users who have not selected a representative image for that business. As discussed below in more detail, with respect to FIG. 12, votes may be tallied from multiple user selections as to what image should be the representative image, and the image with the majority of votes may be used as the default representative image for a particular business.

In an embodiment of the present invention, a user may also provide information and images with respect to a business address via the listing detail page 800. For example, a user may upload his or her own images that may be correlated with a particular business or address. In particular, a business owner may upload an image of the store front that may be associated with the owner's business and provided as the default representative image. In addition to images being provided and correlated with a particular business, other information, such as menus, hours of operation, employee information, and other types of business-related information may also be provided (e.g., uploaded) and associated with a particular business. Such other business-related information may be included on the listing detail page 800.

Also included in the listing detail page 800 may be a link 839 to similar types of businesses. For example, the system 60 may determine from the listings database 67 that "World Famous Ray's Pizza" 801 is of a business type "pizza" and thereby provide a link 839 to other businesses of the type "pizza."

In addition, links 837 to businesses nearby (e.g., on the same street) the selected business may also be provided in the listing detail page 800. The links 837 to nearby businesses may include the business name, business address, telephone number, and optionally, the representative image for the business. The links 837 may be divided up to illustrate links 841 to businesses on the same side of the street as the current business and links 843 to businesses on the other side of the street.

Alternatively, or in addition thereto, the listing detail page 800 may include a link, such as "what's on the other side of the street" (not shown), that if selected will provide a user with information and images for the businesses on the other side of the street. Additionally, such a link may present a full image of the other side of the street. Such an image helps to give additional context to the location of the business for which information is provided in listing detail page 800. Alternatively, a link such as or "See other business on this street" (not shown) may be provided. Selection of this link would provide a user with information about businesses on the current street, not just on the other side of the street. Still further, a link to video of the neighborhood where the business is located may also be provided. The video provided in response to selection of such a link may be, for example, a portion of the video data gathered by the vehicle 9 (FIG. 1) as it traveled down the street on which the business identified in the listing detail page 800 is located.

Figure 9A:
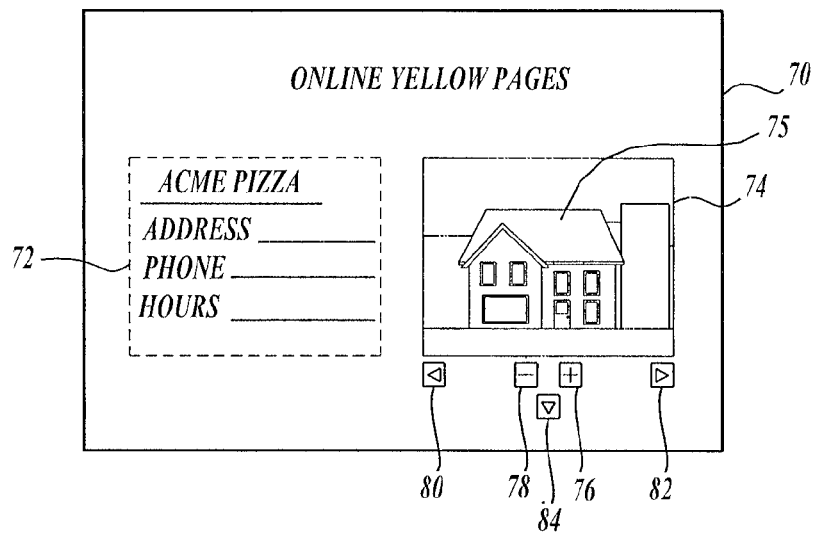
FIGS. 9A-9E depict examples of graphical user interfaces in the form of Web pages received from a directory server and displayed on a client system, illustrating sample operations of an online directory in accordance with the present invention.

FIG. 9A illustrates a detailed view of the address information and corresponding representative image that may be presented in FIG. 7 as part of the listing 707 or as an alternative to the listing detail page 800. The Web page 70 displays the listing 72 of "ACME Pizza," which meets the user's search criteria. The listing 72 includes the name of the business, the address and phone number of the business. Additionally, an image 74 of the business previously taken, correlated with the address in the listing (i.e., an image of the actual structure containing "ACME Pizza" 75 in this case), and identified as the representative image (either default or user specific) is displayed. While the image 74 is automatically displayed together with the display of the listing 72 in this example, it is possible to first display only the listing 72 with a "view image" icon (not shown), and then display the image 74 only upon the user's selection (e.g., clicking) of the "view image" icon. The Web page 70 of address information and corresponding image may further display a "zoom in" icon 76, a "zoom out" icon 78, a "scroll to the left" icon 80, a "scroll to the right" icon 82, and a "what's on the other side of the street" icon 84, any of which can be selected by the user to request a specific operation through the browser application 69 of the client system 61, as will be described with specific examples below. It should be understood that the indicia of these icons are not limited to those illustrated in FIG. 9A. For example, the "zoom in" and "zoom out" icons may display the actual text "zoom in" and "zoom out," as opposed to the plus and minus signs shown in FIG. 9A.

Figure 9B:
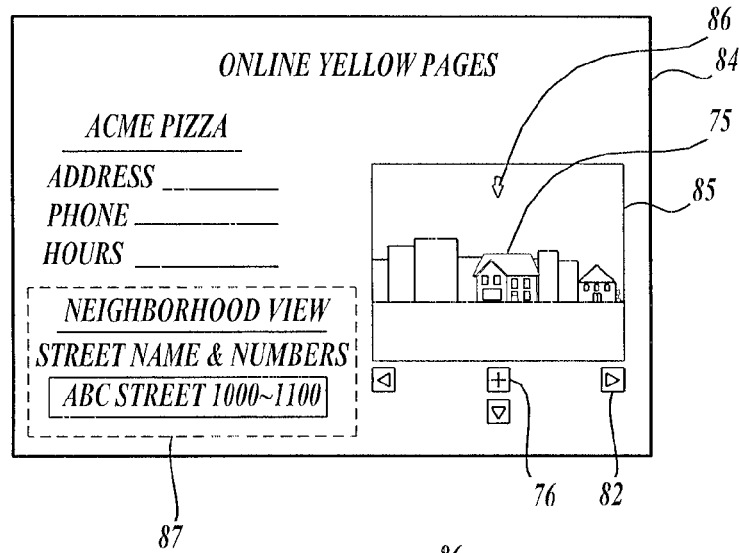

FIG. 9B illustrates a sample Web page 84 created in response to the user's selection of the "zoom out" icon 78 in FIG. 9A, showing a zoomed-out image 85 of "ACME Pizza" 75. Specifically, a wider range of street addresses surrounding (perhaps centering on) the address of "ACME Pizza" is specified according to a predefined program instruction (by the Yellow Pages server 63 of FIG. 6, for example), and the image (or images) corresponding to the specified range of street addresses is retrieved and displayed. An arrow 86 may be displayed to indicate where "ACME Pizza" 75 is in this zoomed-out view. If the image 85 cannot be further zoomed-out, the zoom-out icon 78 need not be displayed and only the zoom-in icon 76 may be displayed at this time. The zoomed-out image 85 is helpful for the user to appreciate the overall neighborhood view surrounding "ACME Pizza." Referring to a box 87, the neighborhood information, for example, the range of street numbers included in the image 85, may be displayed.

Figure 9C:
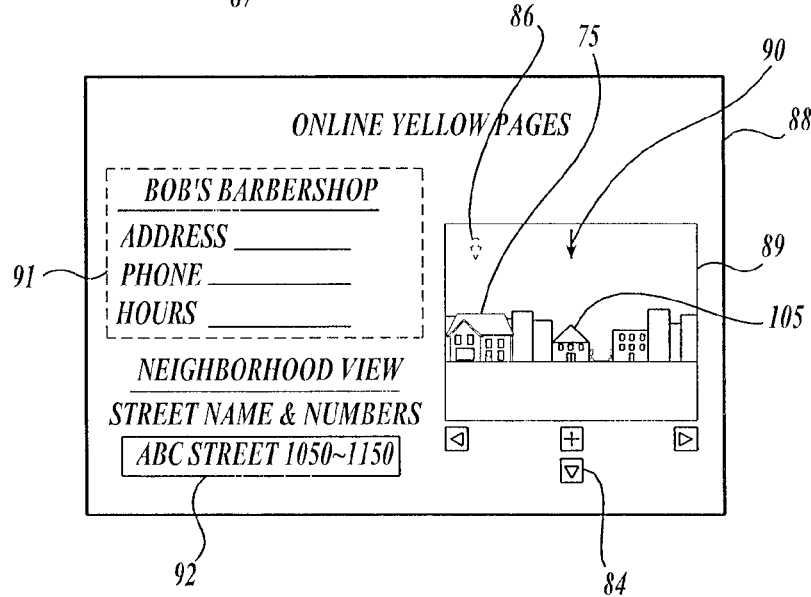

FIG. 9C illustrates a sample Web page 88 created in response to the user's selection of the "scroll to the right" icon 82 in FIG. 9B, showing an image 89 of the neighborhood still including "ACME Pizza" 75 but as shifted to the right (thus showing "ACME Pizza" 75 at the left of the screen). The range of street addresses shown previously in FIG. 9B may be shifted to the right by a specific amount according to a predefined program instruction, and the image (or images) corresponding to the shifted range of street addresses is retrieved and displayed. The arrow 86 may continue to be displayed to indicate where "ACME Pizza" 75 is in this scrolled-to-the-right view. The scroll-to-the-right feature may be limited so that the business of initial interest, "ACME Pizza" 75 in this example, will not disappear from the view. Alternatively, the scroll-to-the-right feature (or the scroll-to-the left feature) may be unlimited and may continue to function as long as the addresses (and the images) are available to the right or left of the image currently shown.

Additionally, a second arrow 90 may be displayed to point to the address (business) at the center of the displayed image 89 ("Bob's Barbershop" 105 in the illustrated example). In this embodiment, the listing information (the business name, address, phone number, business hours, etc.) of the business that the second arrow 90 points to may be displayed, as in box 91. Thus, as the user scrolls the view to the right (or to the left), the listing information of a different business (as centered in the image) is sequentially displayed so that the user can appreciate what types of businesses are located along the street. Also, as the user scrolls the view to the right (or to the left), the street number range displayed in box 92 is updated to reflect what numbers are shown in the image at any given time. For example, FIG. 9B showed an image of "ABC Street 1000-1100" (box 87), while FIG. 9C shows an image of "ABC Street 1050-1150" (box 92), indicating that the image in FIG. 9C has been shifted by 50 street numbers to the right from FIG. 9B.

Figure 9D:
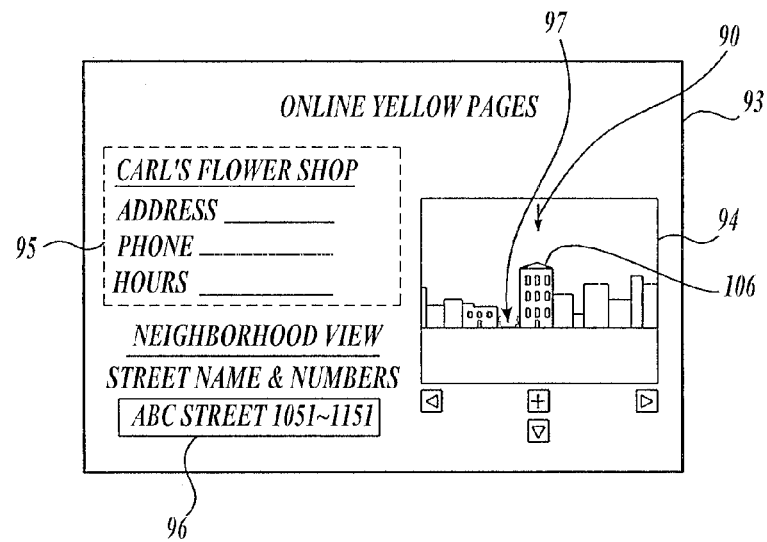

FIG. 9D illustrates a sample Web page 93 created in response to the user's selection of the "what's on the other side of the street" icon 84 in FIG. 9C, showing an image 94 of the neighborhood (at the same scale) that is on the other side of the same street as shown in FIG. 9C. Specifically, a range of street addresses that are on the other side of the same street as shown in FIG. 9C is identified according to a predefined program instruction, and the image (or images) corresponding to the new range of street addresses is retrieved and displayed. The second arrow 90 points to a business located at the center of the image (i.e., directly across the street from "Bob's Barbershop" 105 in FIG. 9C), which is "Carl's Flower Shop" 106, as listed in box 95. As before, the range of street numbers included in the image may be displayed, as in box 96. In the illustrated example, FIG. 9C showed an image of "ABC Street 1050-1150" (even numbers, in box 92), while FIG. 9D shows an image of "ABC Street 1051-1151" (odd numbers, in box 96). The "what's on the other side of the street" feature permits the user to appreciate the neighborhood view along either side of the same street. As in FIG. 9C, when the user scrolls the image 94 of FIG. 9D to the right or to the left, the listing information in the box 95 can be changed to refer to the business presently centered in the image 94 (and pointed to by the second arrow 90).

In FIG. 9D, note that a street 97 extends perpendicular to "ABC Street" (i.e., into the plane of FIG. 9D), indicating the existence of an intersection. Especially at an intersection, the user may wish to obtain a 360-degree view to appreciate the overall atmosphere of the location. Thus, in addition to the images of individual businesses as described above, 360-degree views of selected locations such as intersections may be obtained and correlated with their addresses (e.g., ABC Street and XYZ Boulevard), and stored in the database server 66.

Figure 9E:
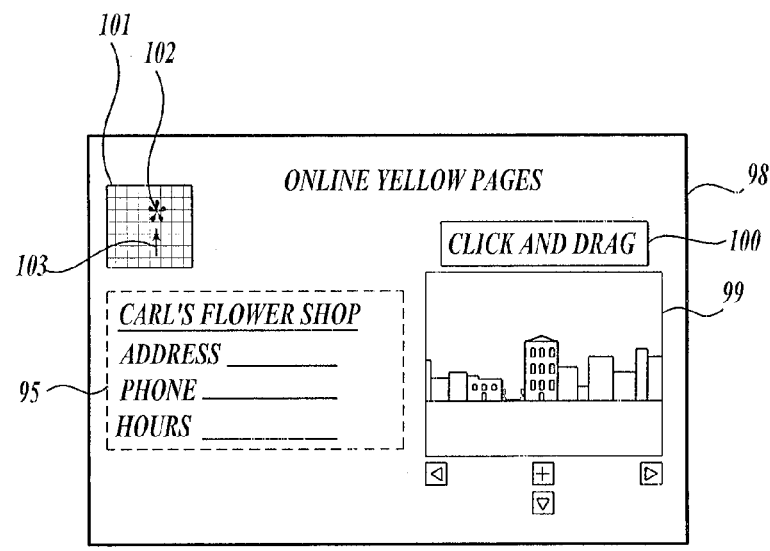

FIG. 9E illustrates a sample Web page 98 suitable for permitting the user to manipulate the view, for example to obtain a 360-degree view of a selected location. Specifically, when a 360-degree view is available, a "Click and Drag" icon 100 may appear to prompt the user to click and drag a cursor on the image 99 itself in the direction in which the user wishes to see a further view. For example, if the user clicks and drags a cursor on the image 99 continuously to the right, then the point of view continuously moves to the right until a complete 360-degree view is obtained. Additionally, clicking and dragging a cursor along a street may shift the point of view along the street to obtain a view as if the user is walking along the street. (Similar to using the "scroll to the right" or "scroll to the left" features, described above.) Specific implementations of a click-and-drag feature are known in the art of virtual reality computing, and need not be described in detail herein. To assist the user in orienting where the user is, a map 101 surrounding the user's current cursor location 102 on the image 99 may be displayed, together with the direction in which the user's view is facing (in the form of an arrow 103). Still alternatively, it is contemplated that the user may click on the map 101 to request and display a neighborhood view of the location clicked, depending on images available in the database server 66.

It is emphasized that FIGS. 9A-9E, as described above, are merely samples of individual business listings that may be displayed individually or in conjunction with other businesses in a listing 707 (FIG. 7). Additionally, FIGS. 9A-9E illustrate examples of how those business listings may be manipulated. As discussed above, selection of the interactive business name or representative image may result in a listing detail page 800 (FIG. 8) that provides still further information regarding a business listing.

While it has been described that address-correlated images are initially stored and retrieved based on a user's inquiry, it is possible to store images in association with geographic locations only, and then correlate an address entered or requested by a user with a particular image later, for example, on-the-fly at the time the user specifies an address.

Figure 10:
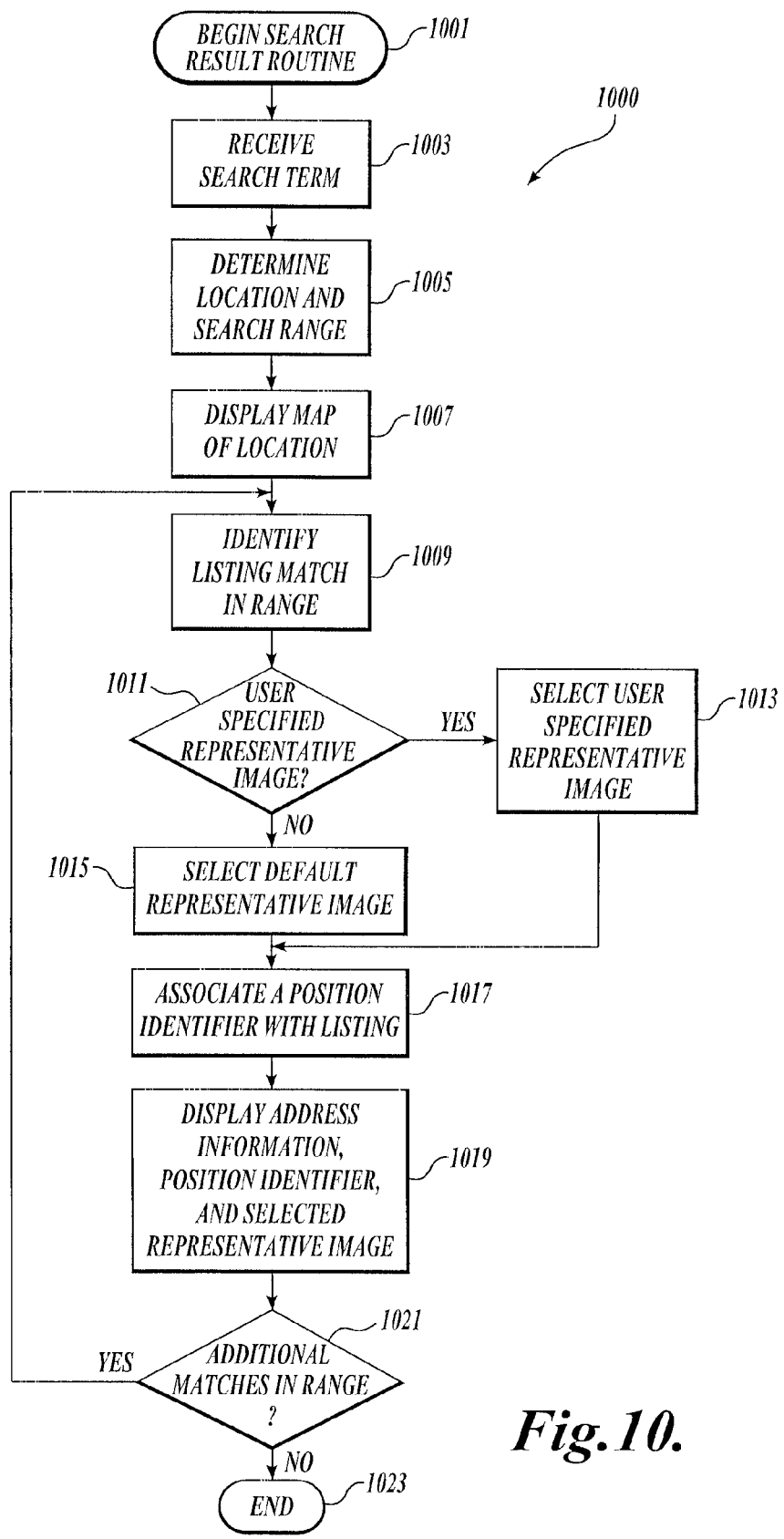
FIG. 10 is a flow diagram of a search results routine utilized to provide listing information in response to a user-provided search request, in accordance with an embodiment of the present invention.

FIG. 10 is a flow diagram of a search results routine utilized to provide listing information in response to a user-provided search request, in accordance with an embodiment of the present invention. The search routine 1000 begins at block 1001 and at block 1003, a search term is received. For example, as discussed above, a user may provide any type of search term for searching for businesses or other addresses, such as to search for all business of the type "pizza."

Upon receipt of a search term at block 1003, at block 1005, the location and search range are determined. The location may be a user-specified location for which the search is to be performed or determined based upon user preferences, such as the user's home address. The search range may also be specified by the user and may be any predetermined range for which a search is to be performed. Once the location and search range have been determined, at block 1007, a map, such as a street map, of the identified location is displayed in a graphical user interface, such as a Web page. In addition to displaying a map of the location at block 1007, at block 1009, a search routine 1000 identifies a listing contained in the listings database 67 that matches the received search terms. At decision block 1011, it is determined whether a user has previously selected a representative image for the identified listing. As discussed above, a representative image may be specified by a user selecting one of a plurality of correlated images for a specific listing as the appropriate representative image for the listing. Any such selection is stored for that particular user as being that user's specified representative image for that address. If it is determined at decision block 1011 that there is a user-specified representative image, at block 1013 that user-specified representative image is selected. However, if it is determined at decision block 1011 that there is no user-specified representative image, at block 1015, the default representative image assigned to the identified listing is selected. A default representative image may be assigned based on either a plurality of votes from other users selecting a representative image for a particular listing, based on the geographic coordinates of the address itself and the correlated image with the closest matching geographic coordinates, or based on selection by the business owner, to list a few examples.

Upon selection of a representative image at either block 1013 or block 1015, at block 1017, a position identifier is associated with the listing. A position identifier may be the number associated with a listing as it is presented to the user or any other identifying criteria such as the representative image or an aerial image of the structure at that address. At block 1019, the identified address information, position identifier, and selected representative image are each displayed to the user via a graphical user interface, such as a Web page. The address information and corresponding image may be displayed adjacent to one another as a listing, and the position identifier may be presented in the map displayed at block 1007 at a position where the business is located within the map. For example, referring back to FIG. 7, address information and corresponding images, such as address information 713, 723 and corresponding image 727, are displayed adjacent to each other as part of the listing 707. Likewise, a position identifier 715 for that address is presented in the map 709.

At decision block 1021, it is determined whether there are any additional listings that match the search terms received at block 1003 that are within the range identified at block 1005. If it is determined at decision block 1021 that there are additional matches, the routine 1000 returns to block 1009 and continues. However, if it is determined at decision block 1021 that there are no additional matches, the routine completes, as illustrated by block 1023.

Figure 11:
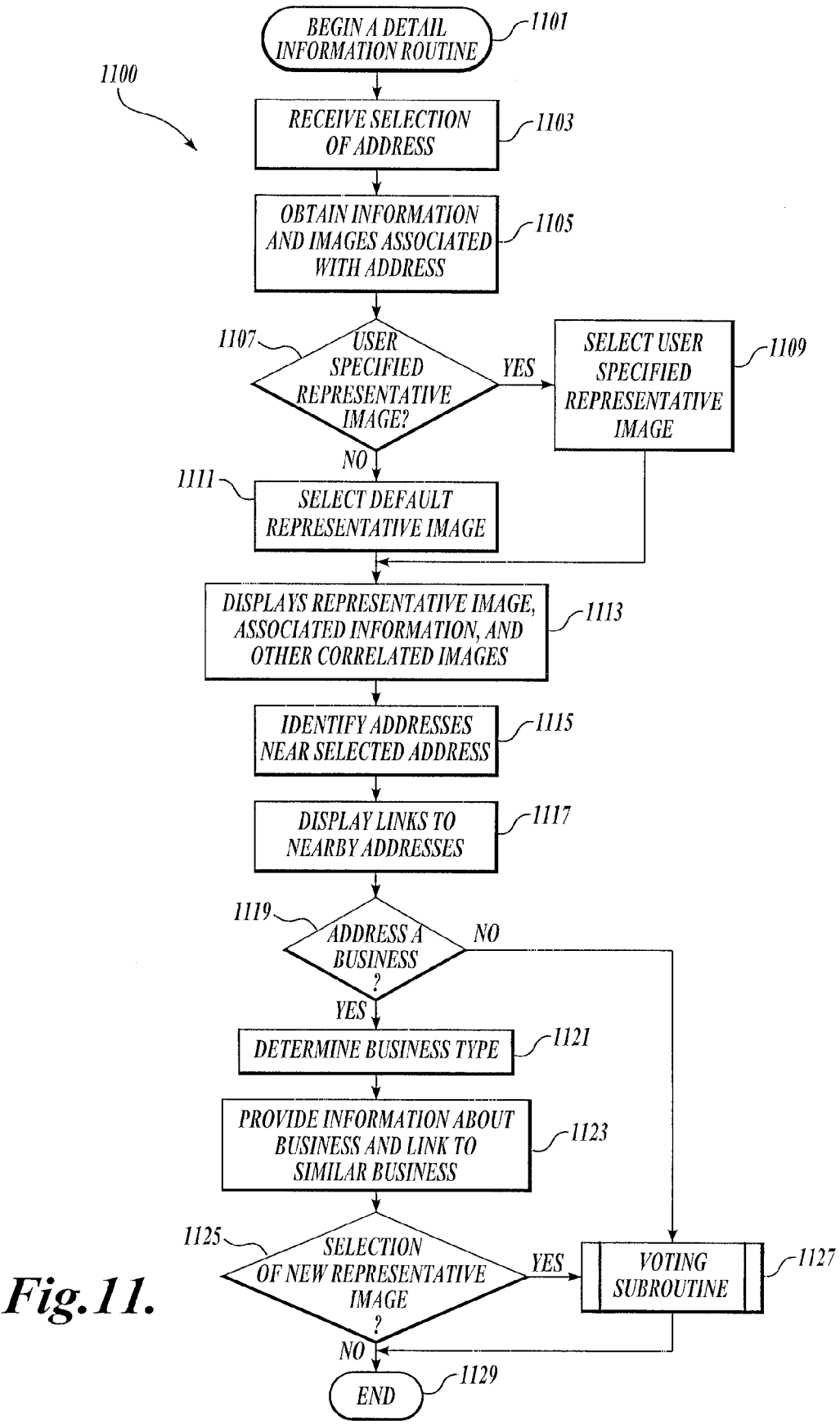
FIG. 11 is a flow diagram of a details information routine for presenting a detailed information view of a selected address, in accordance with an embodiment of the present invention.

FIG. 11 is a flow diagram of a details information routine for presenting a detailed information view of a selected address, in accordance with an embodiment of the present invention. The address selection routine 1100 begins at block 1101 and at block 1103, a selection of an address is received. An address selection may be received in response to a user selecting a particular address from a listing view of several addresses. Alternatively, an address selection may be received in response to a user providing a search term that only returns one matching search result or by a user providing a particular address for which information is desired.

Upon receipt of an address at block 1103, at block 1105, information associated with the address, such as business information, and images previously correlated with the particular address are obtained from the listings database 67 and the images database 68. At decision block 1107, it is determined whether a user has previously selected a representative image for the particular address for which a selection was received. If it is determined at decision block 1107 that there is a user-specified representative image, at block 1109, that user-specified representative image is selected for the particular address. However, if it is determined at decision block 1107 that there is no user-specified representative image, at block 1111, a default representative image is selected. At block 1113, the selected representative image, associated information, and other correlated images for the particular address are displayed in a single graphical user interface, such as a Web page. For example, referring back to FIG. 8, a representative image 807, associated information 801, 803, 805, and other correlated images 817, 819, 821, 823, 825, 827 are displayed in a listing detail page 800.

As discussed above, defining boundaries for an address and correlating all images geographically-located within a defined boundary may result in multiple images being associated with the same address. Those correlated images may be displayed based on their geographic location, the time at which they were taken, based on the season, etc., thereby resulting in what appears to be an overall filmstrip-view of the block on which the selected address is located. The filmstrip-view of images may include the selected representative image that is also displayed as a larger image in the same graphical user interface.

In addition to displaying the selected representative image, associated information, and other correlated images, at block 1115, links to addresses near the selected address may also be provided. The links to nearby addresses may be interactive, and selection of one of those links may result in the routine 1100 being performed for the address identified by the selected link and ultimately a new graphical user interface being provided, containing information for the selected address, a representative image and other correlated images.

At decision block 1119, it is determined whether the selected address received at decision block 1103 is a business address. Such a determination may be made by reviewing the address contained in the listings database 67. If it is determined that the selected address is not a business address, the address selection routine 1100 may proceed to the voting subroutine illustrated by block 1127 and described in more detail with respect to FIG. 12. In an alternative embodiment, if it is determined that the selected address is not a business address, e.g., it is a residential address, the routine 1100 may obtain and provide additional information, such as a telephone number for the address. However, as illustrated in FIG. 11, providing additional information for a non-business address may not be performed due to individual privacy concerns.

Figure 8:
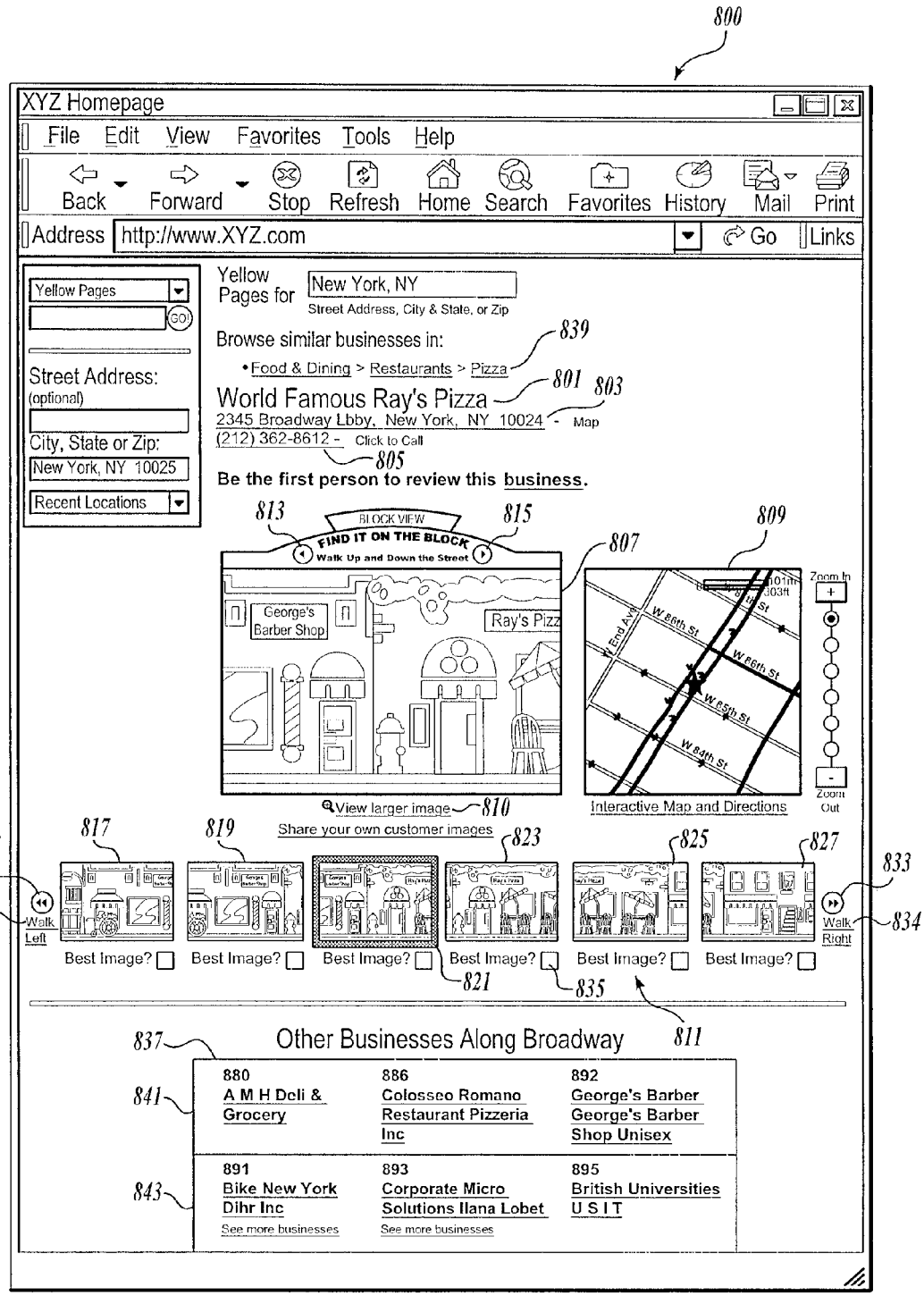
FIG. 8 is a pictorial diagram of a graphical user interface displaying an example of a listing detail page returned to a client system when a user requested detailed information for a particular listing, generated using embodiments of the present invention.

However, if it is determined that the selected address is a business address, at block 1121, the type of business address is determined by obtaining such information from the listings database 67. Upon determination of a business type, at block 1123, information about similar businesses and links to those businesses may be provided. For example, a single link to similar businesses may be provided in a detail view, such as the listing detail page 800 (FIG. 8). Selection of a link to similar businesses may result in a new listings display window (such as listings page 700 of FIG. 7) identifying one or more business addresses and corresponding representative images. Alternatively, several links may be included in the graphical user interface identifying several businesses similar to the business type of the business located at the selected address received at block 1103. At block 1125, a determination is made as to whether a user has provided a selection of what they view as the appropriate representative image. If it is determined at block 1125 that a user has provided a selection of a representative image, the address selection routine 1100 continues to the voting subroutine, as illustrated by subroutine block 1127 and described in detail below. However, if it is determined at decision block 1125 that a user has not selected a new representative image or upon completion of the voting subroutine 1127, the address selection routine 1100 completes, as illustrated by block 1129.

Figure 12:
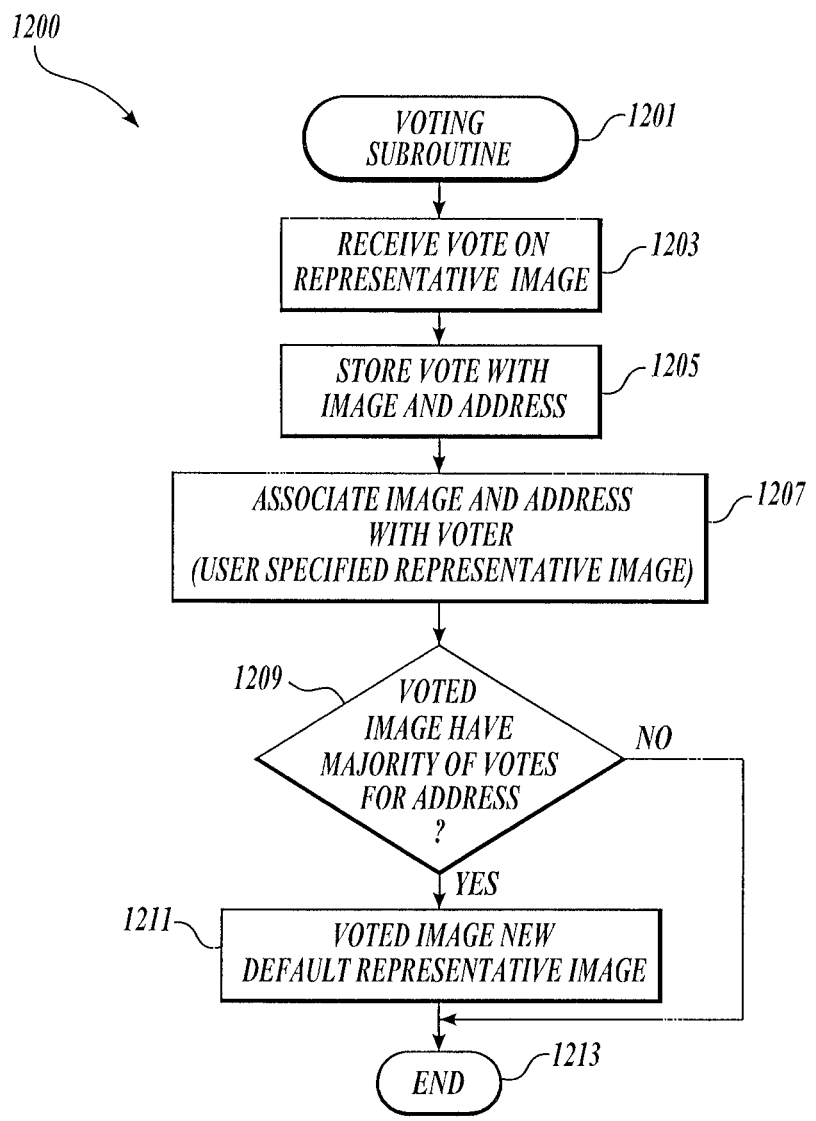
FIG. 12 is a flow diagram of a voting subroutine for designating a representative image for a geographic location in response to user selections, in accordance with an embodiment of the present invention.

FIG. 12 is a flow diagram of a voting subroutine for designating a representative image, for a geographic location in response to user selections, in accordance with an embodiment of the present invention. The voting subroutine 1200 begins at block 1201 and at block 1203 a vote for a best image is received from a user. As discussed above, in a details graphical user interface, such as listing detail page 800 (FIG. 8), a user may be presented with a plurality of images, each of which is correlated to a particular address. A user may select one of those images as being the one that the user perceives as the appropriate representative image for the corresponding address. Upon receipt of a selection or vote for a representative image at block 1203, at block 1205, the vote is stored and associated with the image and address. Additionally, at block 1207, the selected image and the address are associated with the voter (user) so that future selections of that address by that user result in the selected image being displayed as the representative image for that address. At decision block 1209, a determination is made as to whether the voted upon image has a majority of votes for the particular address. If it is determined at decision block 1209 that the voted image does not have a majority of the votes, the subroutine completes, as illustrated by block 1213. However, if it is determined that the voted image does have a majority of the votes for that particular address, at block 1211, that image is identified as being the default representative image for that address. As discussed above, the default representative image is provided to users who have not previously selected a representative image for that address.

Figure 13:
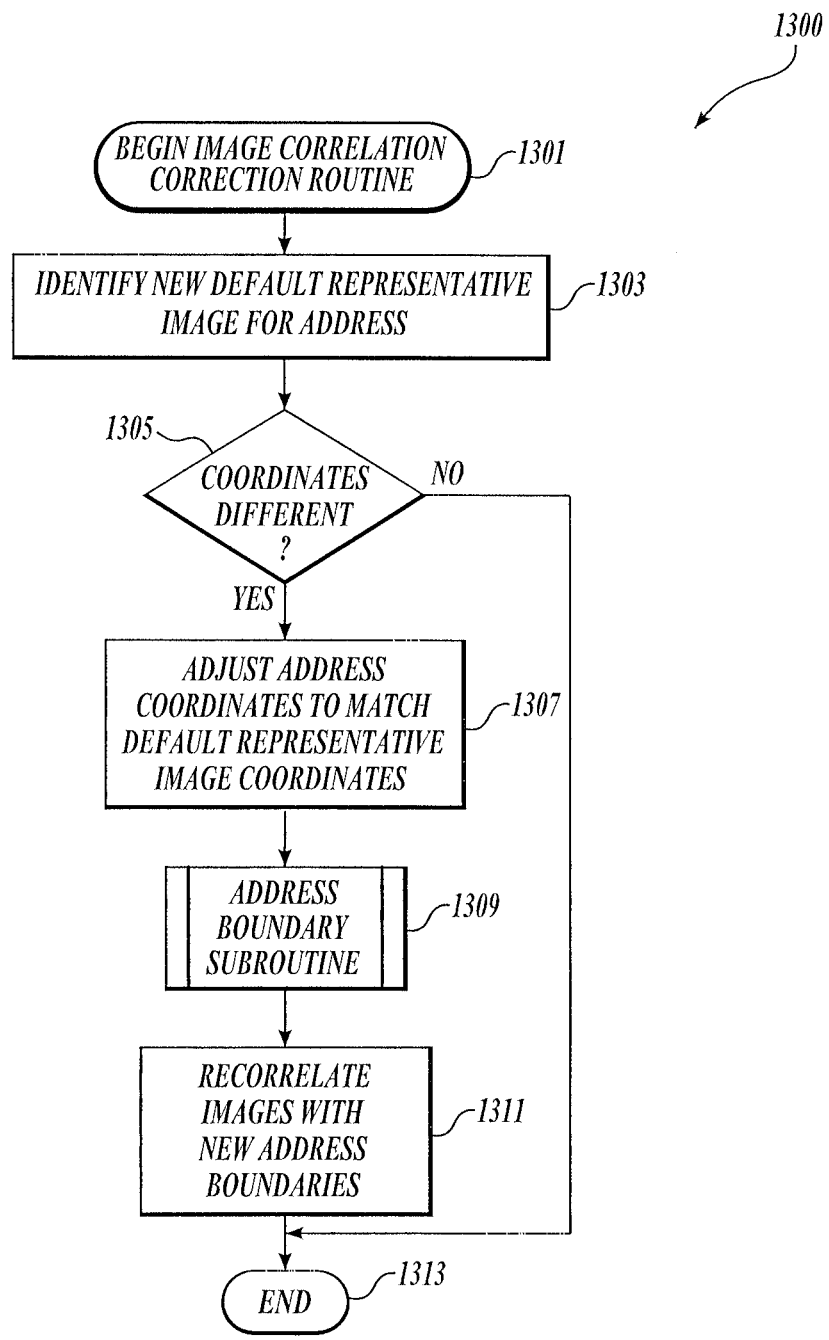
FIG. 13 is a flow diagram of an image correlation correction routine for adjusting the address coordinates for the geographic location of a particular address and recorrelating images to a particular address, according to an embodiment of the present invention.

FIG. 13 is a flow diagram of an image correlation correction routine for adjusting the address coordinates for the geographic location of a particular address and recorrelating images to a particular address, according to an embodiment of the present invention. The image correlation correction routine 1300 begins at block 1301, and at block 1303, a user voted upon default representative image for a particular address is identified. As described above, a default representative image for a particular address may be identified based on a plurality of votes received from different users voting as to which image is perceived to be the appropriate representative image for a particular address. Upon identification of a default representative image for an address at block 1303, at decision block 1305, it is determined whether the coordinates for the image are sufficiently different from the coordinates of the address. The coordinate comparison at decision block 1305 may be determined based on a predetermined threshold. For example, if it is determined that the difference between the address coordinates and the default representative image coordinates is beyond a predetermined threshold, at block 1307, the address coordinates are adjusted to match the default representative image coordinates. However, if it is determined at decision block 1305 that the coordinates are not sufficiently different, the routine completes at block 1313.

Upon address coordinate adjustment at block 1307, at block 1309, an address boundary subroutine is performed, as described in more detail below with respect to FIG. 14. Upon completion of the address boundary subroutine at block 1309, at block 1311, images from the images database 68 are recorrelated based on the new address boundary, or boundaries, defined by the address boundary subroutine 1400. Upon recorrelation of the images at block 1311, or if it is determined at decision block 1305 that the coordinates of the address and the default representative image are not sufficiently different, the image correlation correction routine 1300 completes at block 1313.

Figure 14:
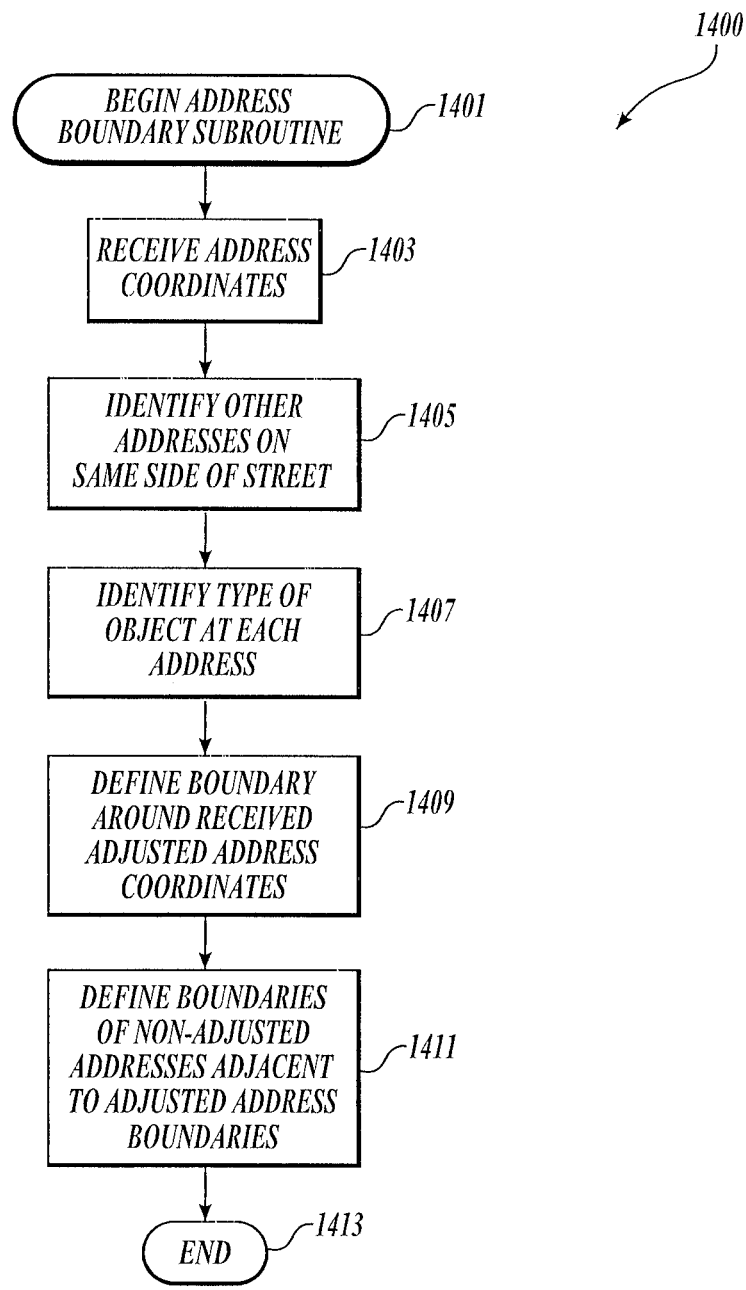
FIG. 14 is a flow diagram of an address boundary definition subroutine for defining address boundaries, in accordance with an embodiment of the present invention.

FIG. 14 is a flow diagram of an address boundary definition subroutine for defining address boundaries, in accordance with an embodiment of the present invention. The address boundary subroutine 1400 begins at block 1401, and at block 1403, address coordinates for an address are received. As discussed above, address coordinates may be obtained from a listings database 67 or may be adjusted address coordinates generated as a result of the image correlation correction routine 1300 (FIG. 13). Upon receipt of address coordinates, at block 1405, addresses on the same side of the street as the received address are identified. At block 1407, the type of object at each address is identified. For example, as discussed above with respect to FIG. 5, it may be identified that one of the addresses is for a grocery store, another a shoe repair store, and another a convenience store.

At block 1409 it is determined which of the identified addresses are adjusted coordinate addresses, and for each adjusted coordinate address at block 1409, an image boundary is defined based on the type of object at the address. At block 1411, for the remaining addresses, i.e., the addresses that are not adjusted coordinate addresses, the image boundaries are defined adjacent to the defined address boundaries defined at block 1409. The image boundaries defined at block 1411 are defined and positioned based on the type of object located at the address and based on the boundaries defined in block 1409. For example, referring back to FIG. 5, if the addresses 505 and 511 are adjusted addresses, i.e., the coordinates for the addresses have been adjusted to coincide with the coordinates of user selected default representative images, the boundaries 507, 511 are defined with respect to the type of object and the address coordinates. Subsequently, the boundary for address 503 would be defined based on the type of object located at address 503 and based on the defined boundaries 507, 511. In particular, the boundary for address 503 would be defined such that it encompasses the area between boundaries 507 and 511, as it is highly likely that the images between boundaries 507 and 511 are representative of the address 509. Additionally, the boundary 509 may be defined such that it either overlaps the adjacent boundaries, as illustrated by overlap 513, or does not overlap adjacent boundaries. The address boundary subroutine 1400 completes at block 1413.

While various embodiments of the invention have been illustrated and described, it will be appreciated that changes can be made therein without departing from the spirit and scope of the invention. The scope of the invention should be determined from the following claims and equivalents thereto.

The invention claimed is:

1. A computer-implemented method for providing information in response to a search request, the method comprising:
under control of one or more computer systems configured with executable instructions,
receiving a search request;
determining a dataset representative of a geographic area for which the search is to be performed based at least in part on the search request;
causing a map representative of at least a portion of the determined geographic area to be displayed;
identifying at least one listing corresponding to the search request, each identified listing being associated with a location within at least the portion of the determined geographic area, wherein the location for at least a subset of the identified listings is determined based at least in part on a lookup table that stores an altered visual emphasis address and corresponding longitude and latitude coordinates for the address;
in response to identifying at least one listing corresponding to the search request, substantially simultaneously
causing interactive information representative of one or more of the identified listings to be displayed adjacent to the map, the interactive information representative of the one or more of the identified listings incorporating (i) one or more first visual indicia corresponding to the one or more of the identified listings and, (ii) distinct from the one or more first visual indicia, a camera-acquired image of an object taken at a geographic location associated with each identified listing of which the interactive information is representative, the camera-acquired image being selected based at least in part on contributions of at least one camera-acquired image from one or more different sources and a number of votes received for a respective camera-acquired image, wherein the camera-acquired image selected corresponds to the camera-acquired image having received a predetermined number of votes, and
causing an interactive position identifier associated with each of the one or more of the identified listings to be displayed on the map, without interaction with the interactive position identifier and substantially simultaneously with a display of the interactive information representative of the one or more of the identified listings adjacent to the map, wherein each interactive position identifier incorporates one or more second visual indicia corresponding to the one or more first visual indicia incorporated in the one or more of the identified listings with which the interactive position identifier is associated;
wherein interaction with the displayed interactive information representative of a first identified listing causes the interactive position identifier displayed for the first identified listing to have an altered visual emphasis; and
wherein interaction with the interactive position identifier for the first identified listing causes the displayed interactive information representative of the first identified listing to have an altered visual emphasis.

2. The computer-implemented method of claim 1, further comprising:
receiving an interaction with the displayed interactive information representative of the first identified listing; and
causing the displayed interactive position identifier associated with the first identified listing to be emphasized.

3. The computer-implemented method of claim 2, wherein causing the interactive position identifier to be emphasized generates a visual alteration of the interactive position identifier.

4. The computer-implemented method of claim 2, further comprising:
identifying a second listing that corresponds to the search request, wherein the second listing is associated with a second location within the geographic area.

5. The computer-implemented method of claim 4, further comprising:
causing a second interactive position identifier associated with the second listing to be displayed on the map.

6. The computer-implemented method of claim 5, wherein causing a first interactive position identifier to be emphasized distinguishes the first interactive position identifier from the second interactive position identifier displayed on the map.

7. The computer-implemented method of claim 4, further comprising:
causing second interactive information representative of the identified second listing to be displayed with the map.

8. The computer-implemented method of claim 7, further comprising:
determining a particular location within the geographic area; and
organizing the display of the interactive information and the second interactive information based at least in part on a distance from the determined particular location.

9. The computer-implemented method of claim 7, wherein the interactive information identifies a first business name and the second interactive information identifies a second business name.

10. A computer system for providing information in response to a search request, the computer system comprising:
one or more databases storing information related to locations within a geographic area; and
a computing device in communication with the one or more databases, the computing device operative to, at least:
determine a geographic area for which the search is to be performed based at least in part on the search request;
cause a map representative of at least a portion of the determined geographic area to be displayed;
identify a plurality of listings stored in the one or more databases that match the search request, the listings each being associated with a respective location within at least the portion of the determined geographic area, wherein the location for at least a subset of the identified listings is determined based at least in part on a lookup table that stores an address and corresponding longitude and latitude coordinates for the address;
in response to identifying a plurality of listings in one or more databases that match the search request, substantially simultaneously
cause a plurality of interactive position identifiers to be displayed on the map, without interaction with any of the plurality of interactive position identifiers, wherein each of the plurality of interactive position identifiers is associated with one of the plurality of listings and incorporates at least one of a first plurality of visual indicia, and
cause the plurality of listings to be displayed adjacent to the map substantially simultaneously with a display of the plurality of interactive position identifiers, wherein at least one of the plurality of listings is interactive and incorporates (i) at least one of a second plurality of visual indicia corresponding to the at least one of first plurality of visual indicia incorporated by the associated at least one interactive position identifier and (ii) distinct from the at least one of the second plurality of visual indicia, a camera-acquired image of an object taken at a geographic location associated with the at least one of the plurality of listings, the camera-acquired image being selected based at least in part on contributions of at least one camera-acquired image from one or more different sources and a number of votes received for a respective camera-acquired image, wherein the camera-acquired image selected corresponds to the camera-acquired image having received a predetermined number of votes;
wherein interaction with displayed interactive information representative of a first listing of the plurality of listings causes the interactive position identifier displayed for the first listing to have an altered visual emphasis; and
wherein interaction with the interactive position identifier for the first listing causes the displayed interactive information representative of the first listing to have an altered visual emphasis.

11. The computer system of claim 10, wherein the computing device is further operative to:
cause a first displayed interactive position identifier of the plurality of displayed interactive position identifiers to be emphasized in response to an interaction with a displayed listing of the plurality of listings.

12. The computer system of claim 11, wherein causing the first displayed interactive position identifier to be identified distinguishes the first displayed interactive position identifier from the remaining plurality of displayed position identifiers.

13. The computer system of claim 10, wherein the computing device is further configured to, at least:
determine a particular location within the geographic area; and
organize the display of the plurality of listings based at least in part on a distance from the determined particular location.

14. The computer system of claim 10, wherein the search request is a search for businesses of a type and each of the plurality of listings identify businesses of that type.

15. A computer-implemented method for obtaining information in response to a search request, the method comprising:
under control of one or more computer systems configured with executable instructions,
providing a search request;
receiving a map representative of an area associated with the search request;
receiving an identification of at least one listing corresponding to the search request, each identified listing being associated with a location within the area represented by the map, wherein the location for at least a subset of the identified listings is determined based at least in part on a lookup table that stores an address and corresponding longitude and latitude coordinates for the address;

in response to receiving an identification of at least one listing corresponding to the search request, substantially simultaneously displaying the map and, adjacent to the map, one or more of the identified listings, each displayed identified listing being interactive and incorporating (i) one or more first visual indicia corresponding to the displayed identified listing and (ii), distinct from the one or more first visual indicia, a camera-acquired image of an object taken at a geographic location associated with the displayed identified listing, the camera-acquired image being selected based at least in part on contributions of at least one camera-acquired image from one or more different sources and a number of votes received for a respective camera-acquired image, wherein the camera-acquired image selected corresponds to the camera-acquired image having received a predetermined number of votes, and displaying on the map at least one interactive position identifier associated with the one or more of the identified listings, without interaction with the at least one interactive position identifier and substantially simultaneously with a display of the one or more of the identified listings adjacent to the map, wherein each interactive position identifier incorporating one or more second visual indicia corresponding to the one or more first visual indicia incorporated in each displayed identified listing;

wherein interaction with displayed interactive information representative of a first identified listing causes the interactive position identifier displayed for the first identified listing to have an altered visual emphasis; and wherein interaction with the interactive position identifier for the first identified listing causes the displayed interactive information representative of the first identified listing to have an altered visual emphasis.

16. The computer-implemented method of claim 15, further comprising:
providing an interaction with the first displayed listing; and
emphasizing the displayed interactive position identifier associated with the first identified listing.

17. The computer-implemented method of claim 15, wherein emphasizing the interactive position identifier generates a visual alteration of the interactive position identifier.

18. The computer-implemented method of claim 15, further comprising:
receiving an identification of a second listing that corresponds to the search request, wherein the second listing is associated with a second location within the area represented by the map; and
displaying on the map a second interactive position identifier associated with the second listing.

19. The computer-implemented method of claim 18, wherein emphasizing the first interactive position identifier distinguishes the first interactive position identifier from the second interactive position identifier displayed on the map.

20. The computer-implemented method of claim 18, wherein at least some of the identified listings comprise an image identified by a user as a representative image.

21. A computer-implemented method for obtaining information regarding at least one object within a range, the method comprising:

under control of one or more computer systems configured with executable instructions, receiving an identification of at least one object within the range for which information is to be provided, each identified object being associated with a location within the range for which information is to be provided, wherein the location for at least a subset of the identified objects is determined based at least in part on a lookup table that stores an address and corresponding longitude and latitude coordinates for the address;

in response to receiving an identification of at least one object, substantially simultaneously displaying information regarding one or more of the identified objects, the displayed information including one or more first visual indicia corresponding to the one or more of the identified objects and, distinct from the one or more first visual indicia, at least one interactive image representative of one or more of the identified objects and camera-acquired at a geographical location associated with the one or more of the identified objects, the at least one camera-acquired interactive image being selected based at least in part on contributions of at least one camera-acquired image from one or more different sources and a number of votes received for a respective camera-acquired image, wherein the camera-acquired image selected corresponds to the camera-acquired image having received a predetermined number of votes, and displaying a map adjacent to and substantially simultaneously with a display of the information regarding the one or more of the identified objects, the map including an interactive identifier of a location of each of the one or more displayed identified objects, wherein the interactive identifier is displayed on the map without interaction with the interactive identifier, and wherein each interactive identifier incorporating one or more second visual indicia corresponding to the one or more first visual indicia included in the displayed information regarding the displayed identified object having the location identified by the interactive identifier;

wherein interaction with the displayed interactive image representative of a first identified object causes the interactive identifier displayed for the first identified object to have an altered visual emphasis; and wherein interaction with the interactive identifier for the first identified object causes the displayed interactive image representative of the first identified object to have an altered visual emphasis.

22. The computer-implemented method of claim 21, wherein receiving an identification of an object includes receiving an identification of a plurality of objects within the range for which information is to be provided.

23. The computer-implemented method of claim 22, wherein displaying information regarding the identified object includes displaying information regarding each of the plurality of identified objects.

24. The computer-implemented method of claim 21, wherein the image is a digital image of the object.

25. The computer-implemented method of claim 21, wherein the image is a street view of the object.

26. The computer-implemented method of claim 21, wherein the image is a user specified representative image.

27. The computer-implemented method of claim 21, wherein the image is an image of a physical object selected from a plurality of images representative of the physical object.

28. The computer-implemented method of claim 21, wherein the information regarding the identified object is interactive.

29. The computer-implemented method of claim 21, further comprising:
- providing an inquiry regarding the displayed information; and
- emphasizing the interactive identifier of the identified object.

30. A computer-readable storage medium having executable instructions stored thereon that, when executed, direct a computing system to, at least:
- receive a search request;
- determine a dataset representative of a geographic area for which the search is to be performed based at least in part on the search request;
- cause a map representative of at least a portion of the determined geographic area to be displayed;
- identify at least one listing corresponding to the search request, each identified listing being associated with a location within at least the portion of the determined geographic area, wherein the location for at least a subset of the identified listings is determined based at least in part on a lookup table that stores an address and corresponding longitude and latitude coordinates for the address;
- in response to identifying at least one listing corresponding to the search request, substantially simultaneously
  - cause interactive information representative of one or more of the identified listings to be displayed adjacent to the map, the interactive information representative of the one or more of the identified listings incorporating one or more first visual indicia corresponding to the one or more of the identified listings and, distinct from the one or more first visual indicia, a camera-acquired image of an object taken at the geographic location associated with the one or more of the identified listings of which the interactive information is representative, the camera-acquired image being selected based at least in part on contributions of at least one camera-acquired image from one or more different sources and a number of votes received for a respective camera-acquired image, wherein the camera-acquired image selected corresponds to the camera-acquired image having received a predetermined number of votes, and
  - cause an interactive position identifier associated with each of the one or more of the identified listings to be displayed on the map without interaction with the interactive position identifier and substantially simultaneously with a display of the interactive information representative of the one or more of the identified listings adjacent to the map, wherein each interactive position identifier incorporating one or more second visual indicia corresponding to the one or more first visual indicia incorporated in the one or more of the identified listings with which the interactive position identifier is associated;
- wherein interaction with the displayed interactive information representative of a first identified listing causes the interactive position identifier displayed for the first identified listing to have an altered visual emphasis; and
- wherein interaction with the interactive position identifier for the first identified listing causes the displayed interactive information representative of the first identified listing to have an altered visual emphasis.

31. The computer-readable storage medium of claim 30, further having instructions stored thereon that direct a computing system to, at least:
- receive an interaction with the displayed interactive information representative of the first identified listing; and
- cause the displayed interactive position identifier associated with the first identified listing to be emphasized.

32. The computer-readable storage medium of claim 31, further having instructions stored thereon that direct a computing system to, at least:
- identify a second listing that corresponds to the search request, wherein the second listing is associated with a second location within the geographic area; and
- cause a second interactive position identifier associated with the second listing to be displayed on the map.

33. The computer-readable storage medium of claim 32, wherein the instructions that direct the computer system to cause the first interactive position identifier to be emphasized distinguishes the first interactive position identifier from the second interactive position identifier displayed on the map.

34. The computer-readable storage medium of claim 32, further having instructions stored thereon that direct a computing system to, at least:
- cause second interactive information representative of the identified second listing to be displayed with the map;
- determine a particular location within the geographic area; and
- organize the display of the interactive information and the second interactive information based at least in part on a distance from the determined particular location.

35. A computer-implemented method for providing information in response to a search request, the method comprising:
- under control of one or more computer systems configured with executable instructions,
  - determining a geographic area for which a search associated with the search request is to be performed;
  - causing a map representative of at least a portion of the determined geographic area to be displayed;
  - identifying a plurality of listings stored in the one or more databases that match the search request, the listings each being associated with a respective location within at least the portion of the determined geographic area, wherein the location for at least a subset of the identified listings is determined based at least in part on a lookup table that stores an address and corresponding longitude and latitude coordinates for the address;
  - in response to identifying a plurality of listings stored in the one or more databases that match the search request, substantially simultaneously
    - causing a plurality of interactive position identifiers to be displayed on the map, without interaction with any of the plurality of interactive position identifiers, wherein each of the plurality of interactive position identifiers associated with one of the plurality of listings and incorporating at least one of a first plurality of visual indicia, and
    - causing the plurality of listings to be displayed adjacent to the map substantially simultaneously with a display of the plurality of interactive position identifiers, wherein at least one of the plurality of listings is interactive and incorporates (i) at least one of a second plurality of visual indicia corresponding to the at least one of first plurality of visual indicia incorporated by an associated at least one interactive position identifier and (ii) distinct from the at least one of the second plurality of visual indicia, a camera-acquired image of an object taken at a geographic location associated with the at least one of the plurality of listings, the camera-acquired image being selected based at least in part on contributions of at least one camera-acquired image from one or more different sources and a number of votes received for a respective camera-acquired image, wherein the camera-acquired image selected corresponds to the camera-acquired image having received a predetermined number of votes;

wherein interaction with displayed interactive information representative of a first listing of the plurality of listings causes the interactive position identifier displayed for the first listing to have an altered visual emphasis, and wherein interaction with the interactive position identifier for the first listing causes the displayed interactive information representative of the first listing to have an altered visual emphasis.

36. The computer-implemented method of claim 35, further comprising:

causing a first displayed interactive position identifier of the plurality of displayed interactive position identifiers to be emphasized in response to an interaction with a displayed listing of the plurality of listings.

37. The computer-implemented method of claim 35, further comprising:

determining a particular location within the geographic area; and organizing the display of the plurality of listings based at least in part on a distance from the determined particular location.

38. The computer-implemented method of claim 35, wherein the search request is a search for businesses of a type and each of the plurality of listings identify businesses of that type.

39. A computer-readable storage medium having executable instructions stored thereon that, when executed, direct a computing system to, at least:

receive an identification of at least one object within a range for which information is to be provided, each identified object being associated with a location within the range for which information is to be provided, wherein the location for at least a subset of the identified objects is determined based at least in part on a lookup table that stores an address and corresponding longitude and latitude coordinates for the address;

in response to receiving an identification of at least one object within the range for which information is to be provided, substantially simultaneously display information regarding one or more of the identified objects, the displayed information including one or more first visual indicia corresponding to the one or more of the identified objects and, distinct from the one or more first visual indicia, at least one interactive image representative of one or more of the identified objects and camera-acquired at a geographical location associated with the one or more of the identified objects, the camera-acquired identified objects being selected based at least in part on contributions of at least one camera-acquired image from one or more different sources and a number of votes received for a respective camera-acquired image, wherein the camera-acquired image selected corresponds to the camera-acquired image having received a predetermined number of votes, and display a map adjacent to and substantially simultaneously with the display of the information regarding the one or more of the identified objects, the map including an interactive identifier of a location of each of the one or more displayed identified objects, wherein the interactive identifier is displayed on the map without interaction with the interactive identifier, and wherein each interactive identifier incorporating one or more second visual indicia corresponding to the one or more first visual indicia included in the displayed information regarding the displayed identified object having the location identified by the interactive identifier;

wherein interaction with the displayed interactive image representative of a first identified object causes the interactive identifier displayed for the first identified object to have an altered visual emphasis; and wherein interaction with the interactive identifier for the first identified object causes the displayed interactive image representative of the first identified object to have an altered visual emphasis.

40. The computer-readable storage medium of claim 39, wherein the instructions that direct the computing system to receive an identification of an object include instructions that direct the computing system to receive an identification of a plurality of objects within the range for which information is to be provided.

41. The computer-implemented method of claim 1, wherein the camera-acquired image incorporated in the interactive information representative of each identified listing is selected from a plurality of images associated with the identified listing in accordance with a set of representative image criteria.

42. The computer-implemented method of claim 41, wherein the camera-acquired image incorporated in the interactive information representative of each identified listing is selected based at least in part on a plurality of user provided votes for at least one of the plurality of images as representative of the identified listing.

43. The computer-implemented method of claim 41, wherein the camera-acquired image incorporated in the interactive information representative of each identified listing is selected based at least in part on a time that the image was taken.

44. The computer-implemented method of claim 43, wherein the camera-acquired image incorporated in the interactive information representative of each identified listing is selected based at least in part on how closely the time that the image was taken matches an annual season.

45. The computer-implemented method of claim 1, wherein:

the interaction with the displayed interactive information representative of a first identified listing to cause the interactive position identifier displayed for the first identified listing to have an altered visual emphasis comprises interaction with one of (i) the one or more first visual indicia and (ii) the camera-acquired image.

46. The computer-implemented method of claim 1, wherein the interaction with the interactive position identifier for the first identified listing causes one of (i) the one or more first visual indicia and (ii) the camera-acquired image incorporated by the displayed interactive information representative of the first identified listing to have an altered visual emphasis.

47. A computer-implemented method for providing information in response to a search request, the method comprising:

under control of one or more computer systems configured with executable instructions, receiving a search request;

determining a dataset representative of a geographic area for which the search is to be performed based at least in part on the search request;

causing a map representative of at least a portion of the determined geographic area to be displayed;

identifying at least one listing corresponding to the search request, each identified listing being associated with a location within at least the portion of the determined geographic area, wherein the location for at least a subset of the identified listings is determined based at least in part on a lookup table that stores an address and corresponding longitude and latitude coordinates for the address;

in response to identifying at least one listing corresponding to the search request, substantially simultaneously causing interactive information representative of one or more of the identified listings to be displayed adjacent to the map, the interactive information representative of the one or more of the identified listings incorporating (i) one or more first visual indicia corresponding to the one or more of the identified listings and, (ii) distinct from the one or more first visual indicia, a camera-acquired image of an object taken at the geographic location associated with each identified listing of which the interactive information is representative, the camera-acquired image being selected based at least in part on contributions from one or more different sources and a number of votes received for a respective camera-acquired image, wherein the camera-acquired image selected corresponds to the camera-acquired image having received a predetermined number of votes, and causing an interactive position identifier associated with each of the one or more of the identified listings to be displayed on the map substantially simultaneously with a display of the interactive information representative of the one or more of the identified listings adjacent to the map, wherein each interactive position identifier incorporates one or more second visual indicia corresponding to the one or more first visual indicia incorporated in the one or more of the identified listings with which the interactive position identifier is associated;

wherein in the event an interaction with the displayed interactive information representative of a first identified listing is detected, the interactive position identifier displayed for the first identified listing is caused to have an altered visual emphasis; and wherein in the event an interaction with at least one of the (i) the one or more first visual indicia and (ii) the camera-acquired image incorporated by the interactive position identifier for the first identified listing is detected, the displayed interactive information representative of the first identified listing is caused to have an altered visual emphasis.

48. The computer-implemented method of claim 1, further comprising:

receiving a contribution of one or more camera-acquired images from a plurality of users, each of the one or more camera-acquired images correlated to a particular listing;

in response to receiving an interaction with the displayed interactive information representative of the particular listing, displaying the one or more camera-acquired images in a filmstrip-view on a listing detail page;

determining a number of clicks received at each one of the one or more camera-acquired images; and selecting one of the one or more camera-acquired images to be incorporated in the interactive information representative of the particular listing based at least in part on the number of clicks received at each of the one or more camera-acquired images.

49. The computer-implemented method of claim 48, wherein the one or the one or more camera-acquired images is selected based at least on receiving a majority of clicks.

50. The computer-implemented method of claim 48, wherein the one or more camera-acquired images for the identified listing is received from one of a plurality of users or a representative of the identified listing.

51. The computer-implemented method of claim 1, wherein each of the one or more camera-acquired images is captured from two or more cameras to obtain a stereoscopic image of an object being imaged.

* * * * *